US012608011B2

(12) United States Patent
Ikeda et al.

(10) Patent No.: US 12,608,011 B2
(45) Date of Patent: Apr. 21, 2026

(54) MOVING OBJECT, REMOTE DRIVING SYSTEM, AND METHOD OF DISABLING REMOTE CONTROL

(71) Applicant: TOYOTA JIDOSHA KABUSHIKI KAISHA, Toyota (JP)

(72) Inventors: Keigo Ikeda, Nisshin (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 18/617,276

(22) Filed: Mar. 26, 2024

(65) Prior Publication Data

US 2024/0329652 A1     Oct. 3, 2024

(30) Foreign Application Priority Data

Mar. 31, 2023     (JP) ................................. 2023-057084

(51) Int. Cl.
| | |
|---|---|
| *G05D 1/227* | (2024.01) |
| *G05B 19/418* | (2006.01) |
| *G05D 1/248* | (2024.01) |
| *G05D 107/70* | (2024.01) |
| *G05D 109/10* | (2024.01) |
| *G05D 111/10* | (2024.01) |
| *G05D 111/30* | (2024.01) |

(52) U.S. Cl.
CPC ....... *G05D 1/227* (2024.01); *G05B 19/41895* (2013.01); *G05D 1/248* (2024.01); *G05D 2107/70* (2024.01); *G05D 2109/10* (2024.01); *G05D 2111/17* (2024.01); *G05D 2111/30* (2024.01)

(58) Field of Classification Search
CPC .......... G05D 1/225–2279; G05D 1/229–2297; G05D 1/244; G05D 1/2446; G05D 1/247–249; G05D 2107/70; G05D 2109/10; G05D 2111/10–17; G05D 2111/30–36; G05D 2105/45; G05B 19/41895
See application file for complete search history.

(56) References Cited

U.S. PATENT DOCUMENTS

| | | | |
|---|---|---|---|
| 2017/0320529 A1* | 11/2017 | Nordbruch ........... | G05D 1/0212 |
| 2017/0357259 A1 | 12/2017 | Foster et al. | |
| 2018/0339703 A1* | 11/2018 | Nix ..................... | G05D 1/0282 |

FOREIGN PATENT DOCUMENTS

| | | |
|---|---|---|
| JP | 2017-538619 A | 12/2017 |

* cited by examiner

*Primary Examiner* — Spencer D Patton
(74) *Attorney, Agent, or Firm* — Sughrue Mion, PLLC

(57)     ABSTRACT

A moving object movable by remote control comprises: a moving object communication unit for receiving a request for driving control from outside the moving object; a driving controller capable of implementing driving control over the moving object in response to the request for driving control during a course of manufacture in a factory for manufacture of the moving object; a signal detection unit for detecting an disablement signal at a predetermined place along a moving route of the moving object; and an disablement implementation unit that performs an disablement process for disabling the remote control if a first condition is fulfilled. The first condition includes an event that the disablement signal is detected or an event that the disablement signal having been detected becomes no longer detected.

11 Claims, 20 Drawing Sheets

MOVING OBJECT, REMOTE DRIVING SYSTEM, AND METHOD OF DISABLING REMOTE CONTROL

CROSS REFERENCE TO RELATED APPLICATIONS

The present application claims priority from Japanese patent application (application No. 2023-057084) filed on Mar. 31, 2023, the disclosure of which is hereby incorporated in its entirety by reference into the present application.

BACKGROUND

The present disclosure relates to a moving object, a remote driving system, and a method of disabling remote control.

For example, Japanese Patent Application Publication (Translation of PCT Application) No. 2017-538619 discloses a vehicle running method of causing a vehicle to run by remote control in a manufacturing system for manufacture of the vehicle from an end of an assembly line of the manufacturing system to a parking area of the manufacturing system.

Consideration is given to disabling a remote control function after the remote control function is used in a factory for manufacture of a moving object and before the moving object is shipped from the factory and arrives at a destination of the shipment. A demand is generated for a technique allowing disablement of the remote control function with proper timing through a simple way.

SUMMARY

The present disclosure is feasible in the following aspects.

(1) According to one aspect of the present disclosure, a moving object movable by remote control is provided. The moving object comprises: a moving object communication unit configured to receive a request for driving control from outside the moving object; a driving controller configured to be capable of implementing driving control over the moving object in response to the request for driving control during a course of manufacture in a factory for manufacture of the moving object; a signal detection unit configured to detect an disablement signal detectable at a predetermined place along a moving route of the moving object; and an disablement implementation unit configured to perform an disablement process for disabling the remote control if a first condition is fulfilled. The first condition includes an event that the disablement signal is detected or an event that the disablement signal having been detected becomes no longer detected.

According to the moving object of this aspect, it is possible to disable the function of remote control over the moving object through the simple way of detecting the disablement signal. Furthermore, adjusting the place of detection of the disablement signal at an appropriate location allows disablement of the function of remote control over the moving object with more proper timing.

(2) In the moving object of the above-described aspect, the disablement signal may be an electromagnetic wave including laser light and an electric wave. The first condition may include an event that the electromagnetic wave is detected by the signal detection unit.

According to the moving object of this aspect, it is possible to perform the disablement process through the simple way of detecting the electromagnetic wave.

(3) In the moving object of the above-described aspect, the disablement signal may be an electric wave for radio communication received by the moving object communication unit from outside the moving object. The first condition may include an event that the electric wave for radio communication having been detected becomes no longer detected.

According to the moving object of this aspect, the electric wave for radio communication received by the moving object communication unit is used instead of a dedicated device for emitting the disablement signal, making it possible to suppress or prevent increase in parts count in the factory.

(4) In the moving object of the above-described aspect, the first condition may include an event that the disablement signal is detected and then a second condition is fulfilled further, or an event that the disablement signal having been detected becomes no longer detected and then the second condition is fulfilled further.

According to the moving object of this aspect, by using the two or more conditions for implementation of the disablement process, it becomes possible to reduce or prevent the occurrence of trouble of disabling the remote control function erroneously.

(5) The moving object of the above-described aspect may further comprise a positioning unit configured to acquire location information about the moving object. The second condition may be an event that moving of the moving object in a stopped state at a speed equal to or greater than a predetermined speed is detected using the location information acquired by the positioning unit.

According to the moving object of this aspect, using the positioning unit allows detection of a moving speed of the moving object in a stopped state. This makes a transport speed during transport of the manufactured moving object from the factory available as a condition for the disablement process.

(6) The moving object of the above-described aspect may further comprise a positioning unit configured to acquire location information about the moving object. The second condition may be an event that leaving the moving object from a location where the disablement signal is detected or from a location where the disablement signal having been detected becomes no longer detected by a distance equal to or greater than a predetermined distance is detected using the location information acquired by the positioning unit.

According to the moving object of this aspect, using the positioning unit allows detection of a moving distance of the moving object in a stopped state. This makes a moving distance during transport of the manufactured moving object from the factory available as a condition for the disablement process.

(7) In the moving object of the above-described aspect, the second condition may be an event that lapse of predetermined time is detected. The predetermined time is time since a moment when the disablement signal is detected or since a moment when the disablement signal having been detected becomes no longer detected.

According to the moving object of this aspect, it is possible to perform the disablement process through the simple way of using time measurement.

(8) In the moving object of the above-described aspect, the second condition may be an event that the moving object is stopped after the disablement signal is detected or after the disablement signal having been detected becomes no longer detected.

According to the moving object of this aspect, by fulfilling the second condition while the moving object is stopped, it becomes possible to reduce or prevent the occurrence of implementation of the disablement process while the moving object is moving.

(9) In the moving object of the above-described aspect, the second condition may be an event that an disablement signal is detected further after the disablement signal is detected or after the disablement signal having been detected becomes no longer detected.

According to the moving object of this aspect, by using the two or more conditions for implementation of the disablement process, it becomes possible to reduce or prevent the occurrence of trouble of disabling the remote control function erroneously. Furthermore, by sharing the same construction between the respective disablement signals used for the first condition and the second condition, it becomes possible to suppress or prevent increase in parts count.

(10) In the moving object of the above-described aspect, the disablement implementation unit may disable the remote control irreversibly as the disablement process.

According to the moving object of this aspect, it is possible to prevent unauthorized remote control by a third party more reliably than in the case of reversible disablement.

(11) According to another aspect of the present disclosure, a remote driving system is provided. The remote driving system comprises: a remote controller configured to move a moving object by remote control, the moving object being movable by the remote control during a course of manufacture in a factory for manufacture of the moving object, the moving object including a moving object communication unit configured to receive a request for driving control, and a driving controller configured to be capable of implementing driving control over the moving object in response to the request for driving control; an disablement signal generator arranged at a predetermined place along a moving route of the moving object, and configured to generate an disablement signal; a signal detection unit for detecting the disablement signal; and an disablement implementation unit configured to perform an disablement process for disabling the remote control if a first condition is fulfilled. The first condition includes an event that the disablement signal is detected or an event that the disablement signal having been detected becomes no longer detected.

According to the remote driving system of this aspect, it is possible to disable the function of remote control over the moving object with proper timing through the simple way of detecting the disablement signal and by adjusting the place of detection of the disablement signal at an appropriate location.

The present disclosure is feasible in various aspects other than the moving object and the remote driving system. For example, the present disclosure may be realized in aspects including a vehicle, a server, a method of disabling remote control, a method of manufacturing a moving object, a method of controlling a moving object, a computer program realizing such a control method, and a non-transitory recording medium storing such a computer program.

DETAILED DESCRIPTION

A. First Embodiment

Figure 1:
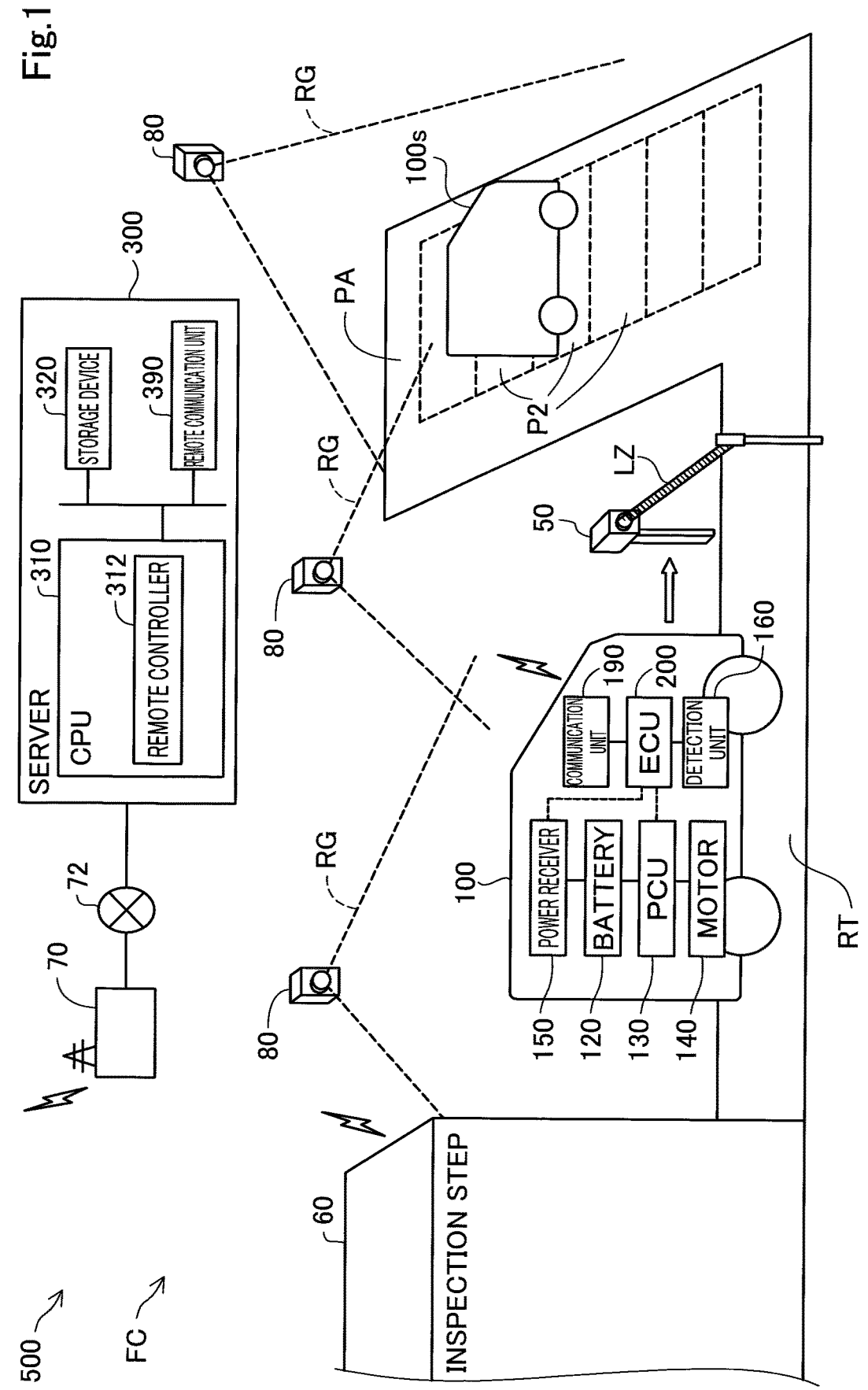
FIG. 1 is an explanatory view showing schematic configurations of a vehicle and a remote driving system according to a first embodiment.

FIG. 1 is an explanatory view showing schematic configurations of a vehicle 100 and a remote driving system 500 according to a first embodiment. The remote driving system 500 is used in a factory FC where a moving object movable by remote control is manufactured. In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate. In the present specification, a state finished as a product, and a state as a semifinished product and a state as an in-process item during manufacture are collectively called a "vehicle."

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving." In the present specification, the "remote control" includes "complete remote control" by which all motions of the vehicle 100 are completely determined from outside the vehicle 100, and "partial remote control" by which some of the motions of the vehicle 100 are determined from outside the vehicle 100.

The remote driving system 500 according to the present embodiment is capable of causing the vehicle 100 to run automatically by remote control during a course of manufacture in the factory FC for manufacture of the vehicle 100. The remote driving system 500 may be a remote driving system that causes a remote operator to operate running of the vehicle 100 manually. The factory FC is provided with a step of manufacturing the vehicle 100, a track RT enabling the vehicle 100 to run, and a standby area PA for waiting for loading for shipment of the vehicle 100 finished by the manufacturing step. The step of manufacturing the vehicle 100 includes an assembly step not shown in the drawings, an inspection step 60, and others. The assembly step is a step of installing parts on a vehicle body, for example. The track RT may include a transport zone in the factory FC connecting the assembly step not shown in the drawings and the inspection step 60 to each other where the vehicle 100 is transported during manufacture, a transport zone from the inspection step 60 to the standby area PA where the vehicle 100 as a finished item is transported, and others, for example. Each of a step in the factory FC and a step during the course of manufacture is not limited to a case where the step exists in one building, at one site, or at one address, etc. Each of a step in the factory FC and a step during the course of manufacture may extend across a plurality of buildings, a plurality of sites, or a plurality of addresses, for example. "Running of the vehicle 100 in the factory FC" includes not only a case where the vehicle 100 runs along a track in a factory existing in one place but also cases where the vehicle 100 runs in transport zones between a plurality of factories at a plurality of places and between a plurality of steps at a plurality of places. "Running of the vehicle 100 in the factory FC" includes a case where the vehicle 100 runs not only on a private road but also on a public road for moving between factories located at a plurality of places and for moving between steps at a plurality of places, for example.

The vehicle 100 having been delivered from the assembly step becomes an item to be processed in the inspection step 60 and runs to the inspection step 60 by remote control by the remote driving system 500. After being subjected to the inspection step 60, the vehicle 100 is finished as a product and runs to the standby area PA by remote control by the remote driving system 500. Then, the vehicle 100 is shipped to a destination country defined for each vehicle 100. The "destination country" means a country where a destination of shipment of the manufactured vehicle 100 exists.

Each of the steps in the factory FC including the assembly step and the inspection step 60 is equipped with a step control device for controlling manufacturing information. The "manufacturing information" includes a progress status of a process by the step, the number of in-process items, the number of products being processed, a manufacturing period in each step, start time and finish time of a process in each step, vehicle identification information about the vehicle 100 present in each step, a scheduled manufacture volume per day, and a target manufacturing period in a step for manufacturing one vehicle 100, for example. The target manufacturing period may also be called "takt time." The "vehicle identification information" means various types of information with which the vehicle 100 is individually identifiable. The vehicle identification information includes ID information given to each vehicle 100 such as a vehicle identification number (VIN), specification information about the vehicle 100 such as a vehicle type, a color, and a shape, and production control information about the vehicle 100 such as the name of a step in which the vehicle 100 is being processed, for example. The vehicle identification information may be acquired from a radio frequency-identification (RF-ID) tag given to the vehicle 100 through short-range radio communication, for example. The step control device in each step acquires a manufacturing status about the vehicle 100 in each step from a camera or a sensor not shown in the drawings provided at each step, and transmits the acquired manufacturing status to a server 300. The manufacturing status in each step may be transmitted to a production control device that collectively controls manufacturing statuses in the steps in the factory FC. The assembly step and the inspection step 60 are described as examples in the present embodiment. Meanwhile, instead of the assembly step and the inspection step 60, various types of steps are adoptable as long as such steps allow the vehicle 100 to run by remote control.

The remote driving system 500 includes a vehicle detector and the server 300. The vehicle detector detects vehicle information including at least one of an image of the vehicle 100 and the location of the vehicle 100. The detected vehicle information is used for remote control by the remote driving system 500. The "vehicle information" may further include a running direction of the vehicle 100 or the position of the vehicle 100. A running direction of the vehicle 100 or the position of the vehicle 100 may be acquired by detecting the shape of the vehicle 100 or a part of the vehicle 100, for example. Meanwhile, only the location of the vehicle 100 may be detected by the vehicle detector, and a running direction or the position of the vehicle 100 may be estimated using temporal change in the vehicle 100.

In the present embodiment, a camera 80 is used as the vehicle detector. The camera 80 is connected to the server 300 in a manner communicable through radio communication or wire communication. The camera 80 has an imaging unit such as a charge coupled device (CCD) image sensor or a complementary metal oxide semiconductor (CMOS) image sensor, for example, and an optical system. The camera 80 is fixed at a location allowing the camera 80 to capture images of the track RT and the vehicle 100 running along the track RT, and acquires an image of the vehicle 100 as the vehicle information. It is possible to acquire various types of vehicle information available for remote control such as the location of the vehicle 100 relative to the track RT and the position of the vehicle 100 by performing image analysis on the image acquired by the camera 80. Using the image from the camera 80 installed in the factory FC makes it possible to implement automatic running of the vehicle 100 by remote control without using a detector mounted on the vehicle 100 such as a camera, a millimeter wave radar, or light detection and ranging (LiDAR). Meanwhile, for a purpose such as prevention of collision during remote control, the detector mounted on the vehicle 100 may be used supplementarily. As long as the vehicle detector is capable of acquiring the location of the vehicle 100, the vehicle detector does not have to acquire an image of the vehicle 100. In this case, the vehicle detector to be used may be various types of detectors such as LiDAR, an infrared sensor, a laser sensor, an ultrasonic sensor, and a millimeter wave radar, for example, capable of detecting the location of the vehicle 100 instead of acquiring an image of the vehicle 100.

The server 300 includes a CPU 310 as a central processing unit, a storage device 320, and a remote communication unit 390. These units are connected to each other via an internal bus or an interface circuit, for example. The remote communication unit 390 is a circuit for communication with the vehicle 100 and others via a network 72.

The storage device 320 is a RAM, a ROM, a hard disk drive (HDD), or a solid state drive (SSD), for example. The storage device 320 has a readable and writable area storing manufacturing information acquired from the step control device in each step or from a manufacturing control device for controlling manufacture in the factory FC, for example. The storage device 320 stores various programs for realizing functions provided in the present embodiment. The CPU 310 executes a computer program stored in the storage device 320. This causes the CPU 310 to function as a remote controller 312, and others. Some or all the functions of these units may be configured by a hardware circuit.

The remote controller 312 implements automatic running of the vehicle 100 in the factory FC by remote control. More specifically, the remote controller 312 transmits a control signal requesting remote control to the vehicle 100 via the remote communication unit 390. When the vehicle 100 accepts the request for remote control, an ECU 200 realizes driving control responsive to the control signal. As a result, the vehicle 100 runs automatically. Transport of the vehicle 100 using automatic running by remote control is also called "self-running conveyance." By implementing the self-running conveyance on the vehicle 100, it becomes possible to reduce or prevent human-induced accidents during running of the vehicle 100.

The vehicle 100 includes a vehicle communication unit 190, a signal detection unit 160, a power receiver 150, a battery 120, a PCU 130, a motor 140, and the electronic control unit (ECU) 200. The vehicle communication unit 190 is a radio communication device such as a dongle, for example, mounted on the vehicle 100. The vehicle communication unit 190 has a communication function of making communication using controller area network (CAN) communication used for control over the vehicle 100 and others, and using diagnosis communication available for diagnosis of failure, etc. The CAN communication is a communication standard allowing multidirectional transmission or reception. The diagnosis communication is a communication standard allowing request and response to be associated with each other on a one-to-one basis. The vehicle communication unit 190 makes radio communication via an access point 70 in the factory FC with devices outside the vehicle 100 such as the server 300 connected to the network 72 and the production control device not shown in the drawings for controlling production information about the vehicle 100 collectively, for example.

The power receiver 150 converts alternating-current power supplied from an external power feeder, for example, to direct-current power using a rectifier, and supplies the direct-current power to the battery 120 as a load. The battery 120 is a chargeable secondary battery such as a lithium-ion battery or a nickel-hydrogen battery, for example. The battery 120 is a high-voltage battery of several hundreds of volts, for example, and stores power to be used for running of the vehicle 100. When the battery 120 receives power supplied to the power receiver 150 from the external power feeder and regenerative power generated by the motor 140, the battery 120 is charged.

The motor 140 is an alternating-current synchronous motor, for example, and functions as an electric motor and a generator. When the motor 140 functions as the electric motor, the motor 140 is driven by the power stored in the battery 120 as a power source. Output from the motor 140 is transmitted through a decelerator and an axle to a wheel. During deceleration of the vehicle 100, the motor 140 functions as the generator using the rotation of the wheel to generate regenerative power. The power central unit (PCU) 130 is electrically connected between the motor 140 and the battery 120.

The PCU 130 has an inverter, a boost converter, and a DC/DC converter. The inverter converts direct-current power supplied from the battery 120 to alternating-current power, and supplies the converted alternating-current power to the motor 140. The inverter converts regenerative power supplied from the motor 140 to direct-current power, and supplies the direct-current power to the battery 120. The boost converter boosts a voltage at the battery 120 when the power stored in the battery 120 is supplied to the motor 140. The DC/DC converter steps down the voltage at the battery 120 when the power stored in the battery 120 is supplied to an auxiliary, for example.

The signal detection unit 160 is a device for detecting an disablement signal. Result of detection of the disablement signal by the signal detection unit 160 is output to the ECU 200. The disablement signal is emitted from a device other than the server 300. The emitted signal is detectable at a predetermined place by the signal detection unit 160. The place where the disablement signal is detectable by the signal detection unit 160 is not limited to one place but may be a plurality of locations within a certain range or may be a plurality of locations within a plurality of ranges.

The disablement signal functions as a trigger for judging implementation of an disablement process. Various electromagnetic waves are available as the disablement signal, for example. In the illustration in FIG. 1, the disablement signal is laser light LZ generated from a laser oscillator 50. A member for generating the disablement signal is also called an "disablement signal generator." In the present embodiment, the disablement signal generator is the laser oscillator 50.

The signal detection unit 160 is provided at an exterior surface of the vehicle 100, for example. The signal detection unit 160 to be used may be a light receiver including a light-receiving element capable of detecting the laser light LZ. In the illustration in FIG. 1, the laser oscillator 50 is installed at an entrance to the standby area PA. When the vehicle 100 running along the track RT enters the standby area PA, the signal detection unit 160 detects the laser light LZ output from the laser oscillator 50. The installation location of the signal detection unit 160 is not limited to the exterior of the vehicle 100 but may be an arbitrary location at the vehicle 100 such as the interior of the vehicle 100. The signal detection unit 160 may be provided removably at the vehicle 100. In this case, the signal detection unit 160 may be removed after implementation of the disablement process, for example. The laser oscillator 50 does not have to be installed at a fixed location but may be movable on the assumption that the laser light LZ is applicable to the signal detection unit 160 of the vehicle 100.

The disablement signal to be used may be light other than the laser light LZ. The disablement signal is not limited only to light but various electromagnetic waves are available such as radio waves, microwaves, infrared rays, visible light rays, ultraviolet rays, X-rays, and y-rays. In this case, a device capable of receiving such electromagnetic waves is used as the signal detection unit 160. Furthermore, electric waves having a variety of frequencies are available as the disablement signal. For example, the electric waves available as the disablement signal are electric waves used in various types of radio communication including short-range wireless such as RF-ID, a wireless personal area network (PAN) conforming to IEEE 802.15, and a wireless LAN conforming to IEEE 802.11. In this case, the signal detection unit 160 to be used may be a reception device capable of receiving an electric wave as the disablement signal.

Figure 2:
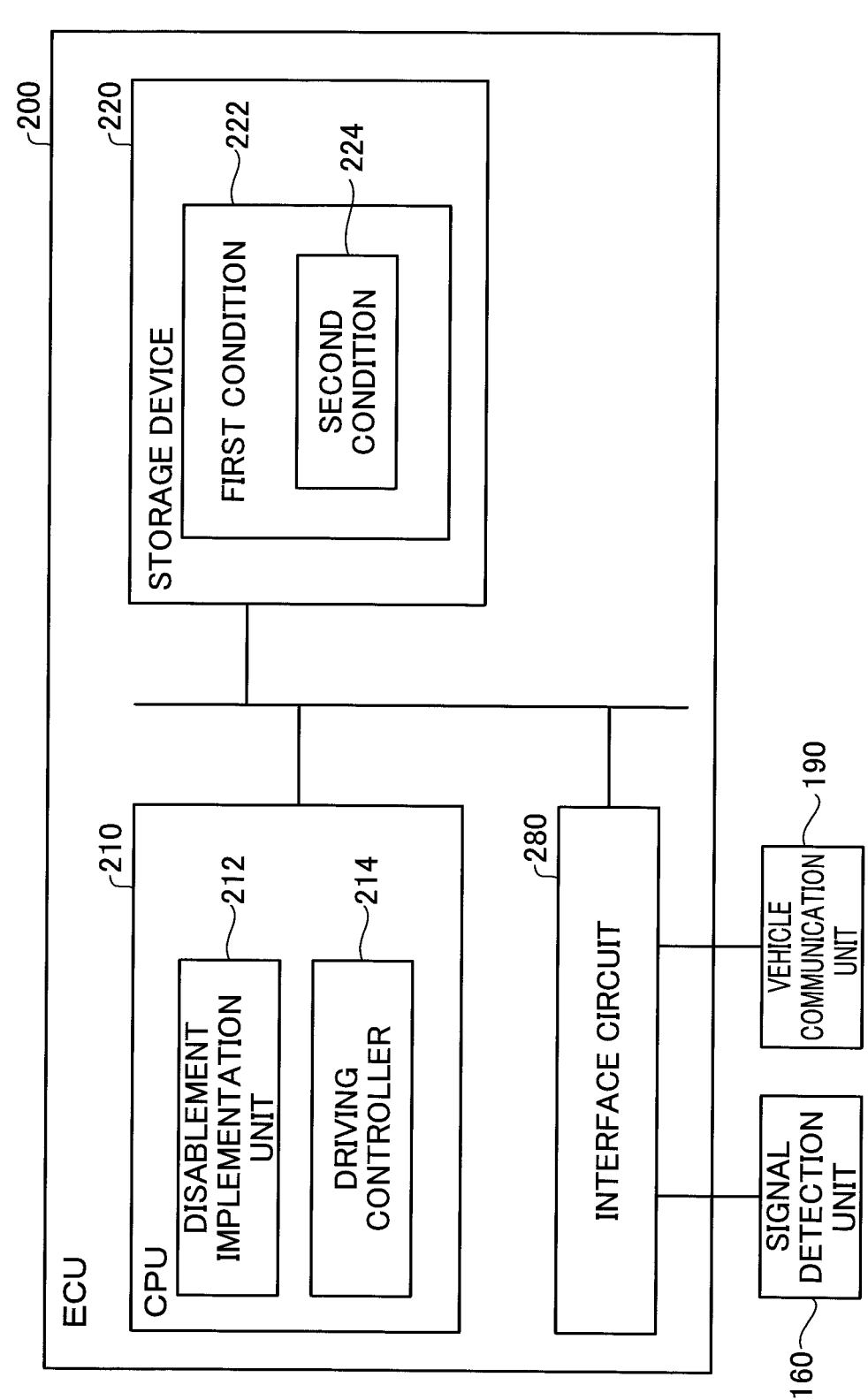
FIG. 2 is a block diagram showing an internal functional configuration of an ECU.

FIG. 2 is a block diagram showing an internal functional configuration of the ECU 200. The ECU 200 is mounted on the vehicle 100 and implements various types of control over the vehicle 100. The ECU 200 includes a storage device 220 such as a hard disk drive (HDD), a solid state drive (SSD), an optical recording medium, or a semiconductor memory, for example, a CPU 210 as a central processing unit, and an interface circuit 280. The signal detection unit 160, the vehicle communication unit 190, and others are connected to the interface circuit 280. The storage device 220 stores a first condition 222 and a second condition 224. The first condition 222 and the second condition 224 are conditions used in implementation of the disablement/invalidation process by an disablement implementation unit 212.

In the present embodiment, the first condition 222 is fulfilled if the signal detection unit 160 detects a predetermined disablement signal. The second condition 224 is a condition covered by the first condition 222, and is a condition used after the disablement signal is detected. Specifically, if the disablement signal is detected and then the second condition 224 is fulfilled further, the disablement implementation unit 212 judges that the first condition 222 is fulfilled and implements the disablement process. Without using the second condition 224, the first condition 222 may be fulfilled if a predetermined disablement signal is detected. As the first condition 222, a plurality of two or more conditions may be used including another condition in addition to the second condition 224.

The storage device 220 stores various programs for realizing functions provided in the present embodiment. The CPU 210 executes various computer programs stored in the storage device 220, thereby realizing various functions including those of the disablement implementation unit 212 and a driving controller 214.

The driving controller 214 implements driving control over the vehicle 100. The "driving control" is adjustment of an acceleration, a speed, and a rudder angle, for example. Under the driving control by remote control, the driving controller 214 controls each actuator mounted on the vehicle 100 in response to a request for the remote control received from the server 300 via the vehicle communication unit 190. Furthermore, the ECU 200 controls the PCU 130 to control transfer of power between the battery 120 and the motor 140.

The disablement implementation unit 212 performs the disablement process of disabling driving control over the vehicle 100 by remote control. The "disablement of driving control by remote control" means loss of a function being a part of the function of the driving controller 214 and carried out for implementing driving control in response to a request for remote control. If the first condition 222 is judged to be fulfilled, the disablement implementation unit 212 performs the disablement process. In the present embodiment, if an disablement signal is detected and then the second condition 224 is fulfilled further, the disablement implementation unit 212 judges that the first condition 222 is fulfilled and implements the disablement process. When the disablement implementation unit 212 performs the disablement process, the driving controller 214 makes a transition to a state where a control request for remote control is disabled. Disabling driving control by remote control makes it possible to prevent running of the vehicle 100 caused by unauthorized remote control by a third party, for example.

The disablement of remote control includes reversible disablement allowing disabled remote control to be restored to a valid state if a certain condition is met, and irreversible disablement prohibiting the restoration. The reversible disablement may be realized by encrypting a program responsible for a function being a part of the function of the driving controller 214 and carried out for implementing driving control under remote control, and generating a state allowing decryption of the program only by a person having a certain right, for example. The irreversible disablement may be realized by a way such as deleting a program responsible for a function of implementing driving control under remote control or physically cutting connection to such a program or to hardware having such a function, for example. From the viewpoint of enhancing security, remote control is preferably disabled irreversibly if the remote control is not to be implemented in the future. If remote control is to be implemented in the future, the remote control is preferably disabled reversibly in a period until implementation of the remote control. In the present embodiment, the disablement implementation unit 212 implements the irreversible disablement as the disablement process. Meanwhile, the disablement implementation unit 212 may implement the reversible disablement. From the viewpoint of enhancing security, the ECU 200 is preferably equipped with a secure microcontroller with a field programmable gate array (FPGA), a flash memory, and others, or a hardware security module (HSM), for example.

Figure 3:
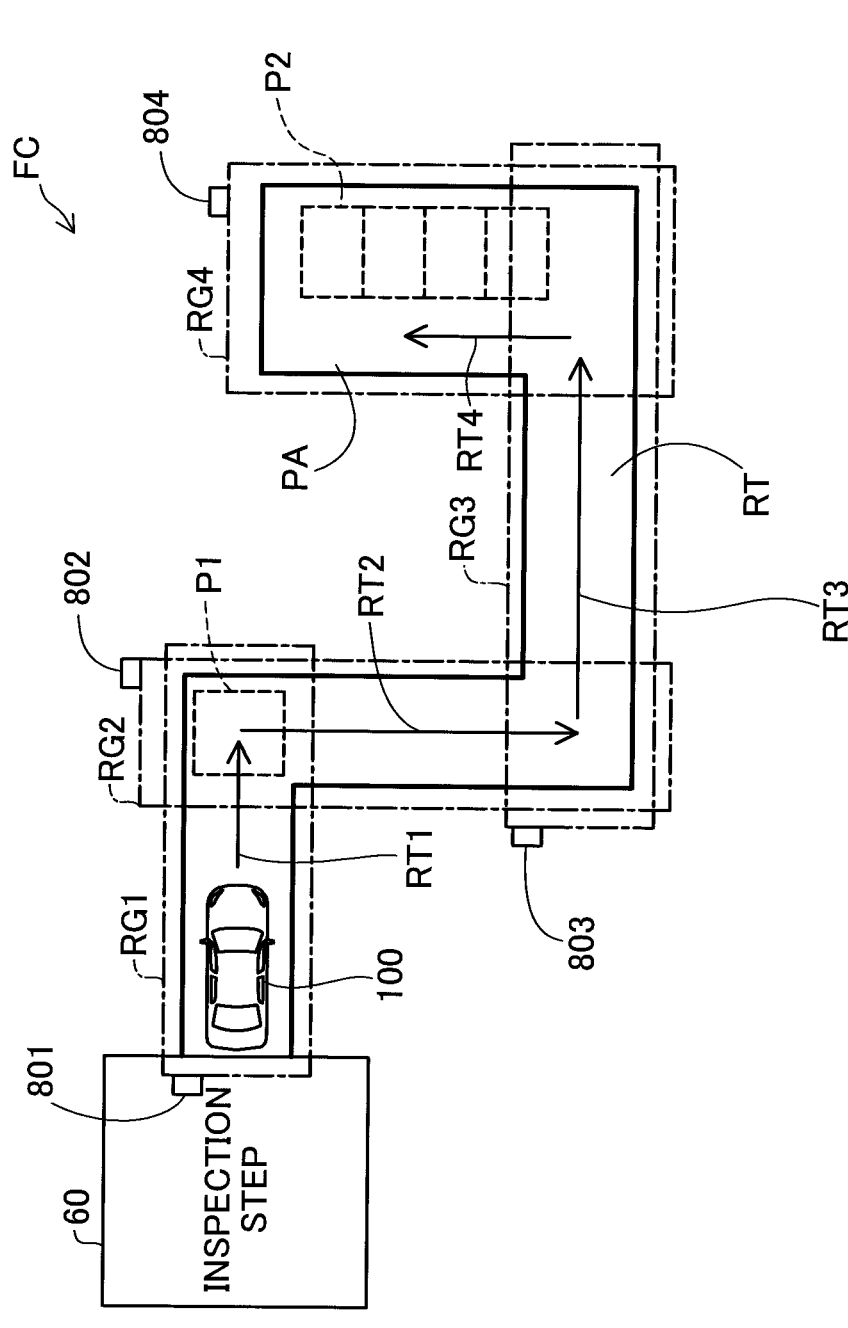
FIG. 3 is an explanatory view showing automatic driving control over the vehicle by remote control by a remote controller.

FIG. 3 is an explanatory view showing automatic driving control over the vehicle 100 by remote control by the remote controller 312. In the illustration in FIG. 3, the track RT includes a first track RT1, a second track RT2, a third track RT3, and a fourth track RT4 continuous with each other. The first track RT1 and the second track RT2 are connected to each other across a right-angled curve. The standby area PA is provided on the fourth track RT4.

As shown in FIG. 3, the camera 80 as the vehicle detector acquires images of the vehicle 100 on the track RT and in the standby area PA viewed from above. The number of the cameras 80 is set by giving consideration to angles of view of the cameras 80, etc. to a number allowing imaging of the track RT and the standby area PA entirely. In the illustration in FIG. 3, the camera 80 includes a camera 801 allowing imaging of a range RG1 covering the first track RT1 entirely, a camera 802 allowing imaging of a range RG2 covering the second track RT2 entirely, a camera 803 allowing imaging of a range RG3 covering the third track RT3 entirely, and a camera 804 allowing imaging of a range RG4 covering the fourth track RT4 and the standby area PA entirely. The camera 80 may acquire not only an image captured from above the vehicle 100 but also an image captured from the front, back, or side of the vehicle 100, for example. Cameras for acquiring such images may be used freely in combination.

The track RT has a standard running route set in advance as a route along which the vehicle 100 is to run under remote control. The remote controller 312 acquires images of the track RT and the vehicle 100 provided by the camera 80 through radio communication with the vehicle 100 via the access point 70. The remote controller 312 causes the ECU 200 to implement driving control over the vehicle 100 while analyzing the acquired images at a certain time interval. If the remote controller 312 makes a request for remote control to the vehicle 100, the remote controller 312 sequentially adjusts the location of the vehicle 100 relative to the standard route, thereby allowing the vehicle 100 to run along the standard route. For the remote control, an image of the entire vehicle 100 may be used or an image of a part of the vehicle 100 such as an alignment mark given to the vehicle 100 may be used.

The cameras 80 are configured in such a manner that, at a connecting location between tracks such as a location P1 shown in FIG. 3, the angles of view of the cameras 80 corresponding to the respective connected tracks overlap each other. At the location P1, for example, the angle of view of the camera 801 corresponding to the first track RT1 and the angle of view of the camera 802 corresponding to the second track RT2 overlap each other. The vehicle 100 having been delivered from the inspection step 60 runs to the location P1 by remote control using an image captured by the camera 801. When the vehicle 100 arrives at the location P1, switch is made to remote control using a captured image acquired by the camera 802 instead of the camera 801 and the vehicle 100 runs along the second track RT2. Likewise, an image captured by the camera 803 is used for running along the third track RT3, and an image captured by the camera 804 is used for running along the fourth track RT4 and in the standby area PA. In this way, the remote controller 312 implements remote control over the vehicle 100 while switching a captured image to be analyzed properly on the basis of the range of the track RT. The remote controller 312 is capable of stopping the vehicle 100 at a parking location P2 in the standby area PA by remote control.

Figure 4:
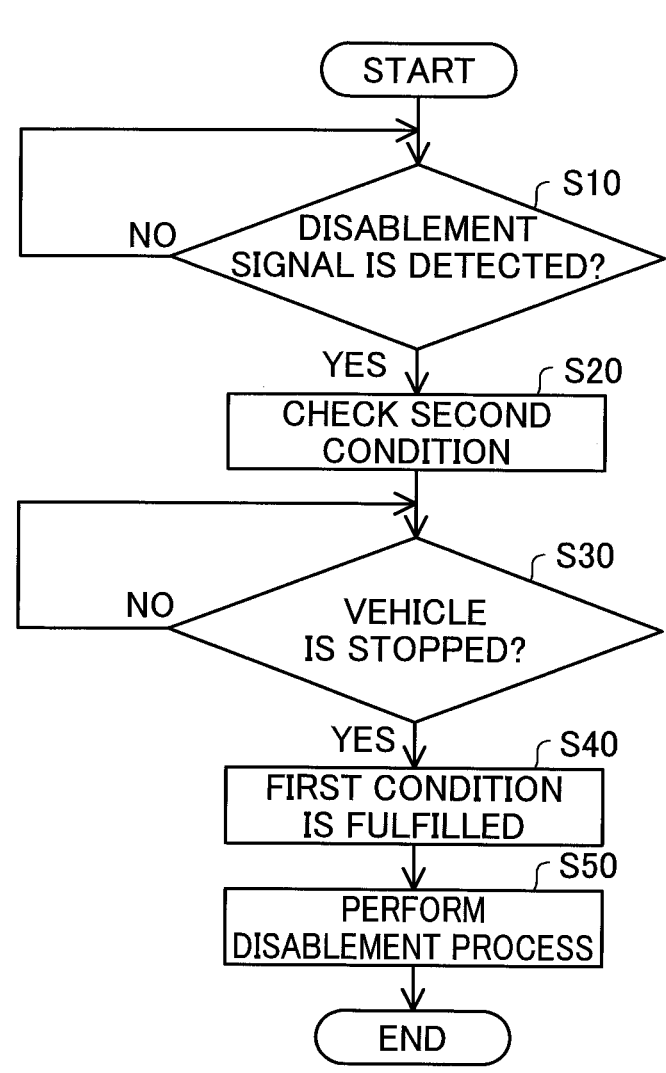
FIG. 4 is a flowchart showing a processing routine of a method of disabling remote control according to the first embodiment.

FIG. 4 is a flowchart showing a processing routine of a method of disabling remote control according to the first embodiment. This flow is started in response to powering-on of the vehicle 100, for example. This flow may be started in response to completion of a process in a step performed prior to timing of implementation of the disablement process or in response to determination that the vehicle 100 has started running after completion of the process in this prior step.

In step S10, the disablement implementation unit 212 waits for detection of an disablement signal by the signal detection unit 160. If the signal detection unit 160 detects an disablement signal (S10: YES), the disablement implementation unit 212 moves the process to step S20 and checks the second condition 224. In the illustration in FIG. 1, when the vehicle 100 running along the track RT enters the standby area PA, the signal detection unit 160 detects the laser light LZ output from the laser oscillator 50 as the disablement signal.

In step S30, the disablement implementation unit 212 waits for stop of the vehicle 100. Specifically, the disablement implementation unit 212 waits for fulfillment of the second condition 224. Stop of the vehicle 100 may be detected by determining that the vehicle 100 has been powered off, determining that a prime mover mounted on the vehicle 100 has been turned off (so-called ignition-off), or detecting implementation of driving control by the remote controller 312 for stopping the vehicle 100, for example. If the disablement implementation unit 212 detects stop of the vehicle 100 (S30: YES), the disablement implementation unit 212 moves the process to step S40 and judges that the first condition 222 including the second condition 224 is fulfilled. In the illustration in FIG. 1, the vehicle 100 arrives at the parking location P2 in the standby area PA and is powered off. As a result, the disablement implementation unit 212 judges that the second condition 224 is fulfilled.

In step S50, the disablement implementation unit 212 performs the disablement process to disable driving control over the vehicle 100 by remote control. As a result, the driving controller 214 makes a transition to a state where a control request for remote control is disabled. In the present embodiment, the disablement implementation unit 212 implements the irreversible disablement of deleting a program relating to remote control stored in the storage device 220.

As described above, the vehicle 100 of the present embodiment includes: the vehicle communication unit 190 for receiving a request for driving control from the remote controller 312 of the server 300; the driving controller 214 capable of implementing driving control over the vehicle 100 in response to the request for driving control; the signal detection unit 160 for detecting an disablement signal emitted from the laser oscillator 50 installed at a predetermined place; and the disablement implementation unit 212 that judges that the first condition 222 is fulfilled if the disablement signal is detected, and performs the disablement process for disabling remote control. The vehicle 100 of the present embodiment makes it possible to disable remote control by detecting the disablement signal emitted at the predetermined place. By doing so, it becomes possible to disable the function of remote control over the vehicle 100 with proper timing through the simple way of detecting the disablement signal. Furthermore, adjusting the place of detection of the disablement signal allows disablement of the function of remote control over the vehicle 100 with proper timing. The vehicle 100 is capable of performing the disablement process in a so-called stand-alone state without making communication with a device outside the vehicle 100 such as the server 300.

In the vehicle 100 of the present embodiment, the disablement implementation unit 212 performs the disablement process if the signal detection unit 160 detects the laser light LZ. It is possible to perform the disablement process through the simple way of detecting the laser light LZ.

In the vehicle 100 of the present embodiment, the disablement implementation unit 212 performs the disablement process if the disablement signal is detected and then the second condition 224 is fulfilled further. By using the two or more conditions in this way, it becomes possible to reduce or prevent the occurrence of trouble of disabling remote control erroneously.

In the vehicle 100 of the present embodiment, the disablement implementation unit 212 judges that the second condition 224 is fulfilled if the disablement signal is detected and then stop of the vehicle 100 is detected further, and performs the disablement process. By fulfilling the second condition 224 while the vehicle 100 is stopped, it becomes possible to reduce or prevent the occurrence of implementation of the disablement process while the vehicle 100 is running.

In the vehicle 100 of the present embodiment, the disablement implementation unit 212 implements the irreversible disablement of remote control as the disablement process. This makes it possible to prevent unauthorized remote control by a third party more reliably than in the case of the reversible disablement.

B. Second Embodiment

Figure 5:
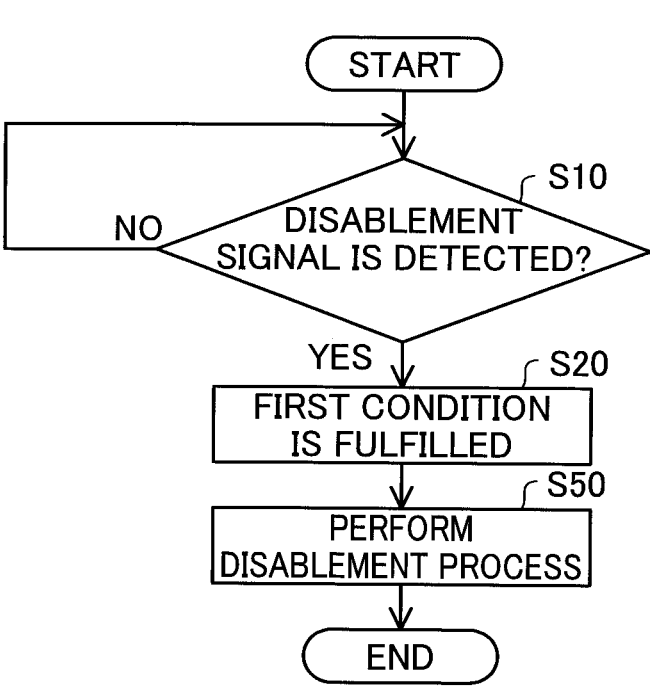
FIG. 5 is a flowchart showing a processing routine of a method of disabling remote control according to a second embodiment.
Figure 6:
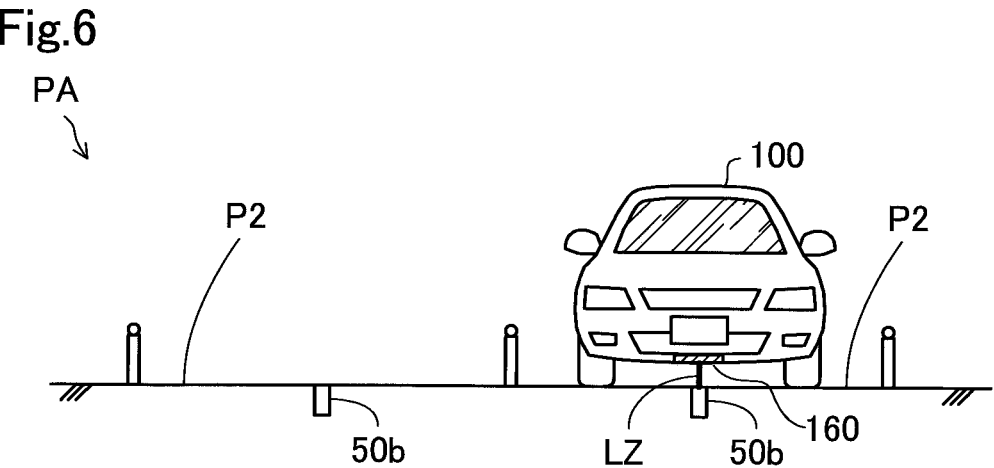
FIG. 6 is an explanatory view showing a method of detecting an disablement signal according to the second embodiment.

FIG. 5 is a flowchart showing a processing routine of a method of disabling remote control according to a second embodiment. FIG. 6 is an explanatory view showing a method of detecting an disablement signal according to the second embodiment. As shown in FIG. 5, the disablement method according to the second embodiment differs from the disablement method according to the first embodiment shown in FIG. 4 in that it does not include step S30 and step S40. Specifically, in the present embodiment, the second condition 224 is not provided and the disablement process is performed in response to detection of an disablement signal. The configuration of a remote driving system 500 is the same as that of the first embodiment.

As shown in FIG. 6, a laser oscillator 50b as an disablement signal generator is installed at a location different from the installation location of the laser oscillator 50 described in the first embodiment. More specifically, the laser oscillator 50b is installed at each of a plurality of parking locations P2 belonging to the standby area PA, instead of the entrance to the standby area PA shown in FIG. 1. In the illustration in FIG. 6, the laser oscillator 50b is buried at the parking location P2 and is configured so as to be capable of emitting the laser light LZ to the vehicle 100 parked at the parking location P2. The signal detection unit 160 is provided on a bottom part of the vehicle 100 and detects the laser light LZ from the laser oscillator 50b. The laser oscillator 50b does not have to be buried but may be arranged around the parking location P2, for example. In this case, the signal detection unit 160 is provided at a location on a part of the vehicle 100 where the laser light LZ from the laser oscillator 50b is detectable.

As shown in FIG. 6, when the vehicle 100 is stopped at the parking location P2 in the standby area PA for waiting for loading, for example, the signal detection unit 160 detects the laser light LZ as an disablement signal. The disablement implementation unit 212 judges that the first condition 222 is fulfilled in response to detection of the laser light LZ, and performs the disablement process. Like in the first embodiment, the remote driving system 500 having this configuration is capable of disabling remote control by detecting an disablement signal emitted at a predetermined place. Furthermore, omitting the second condition 224 achieves reduction in processing load on the disablement implementation unit 212.

C. Third Embodiment

Figure 7:
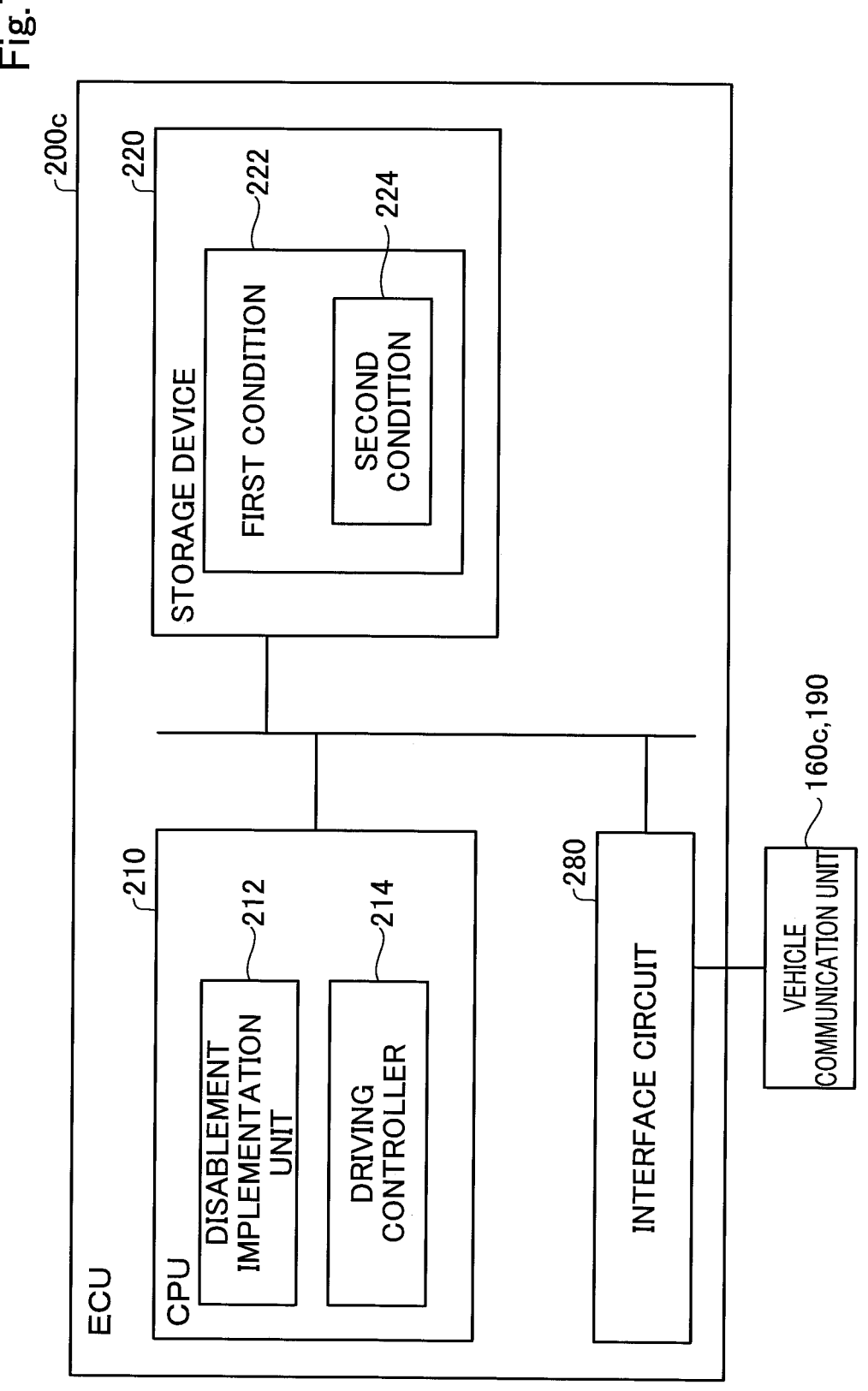
FIG. 7 is a block diagram showing a functional configuration of an ECU provided at a vehicle according to a third embodiment.

FIG. 7 is a block diagram showing a functional configuration of an ECU 200c provided at the vehicle 100 according to a third embodiment. As shown in FIG. 7, the vehicle communication unit 190 further functions as a signal detection unit 160c. Specifically, in the present embodiment, an electric wave for radio communication received by the vehicle communication unit 190 from the access point 70 outside the vehicle 100 is used as an disablement signal.

Figure 8:
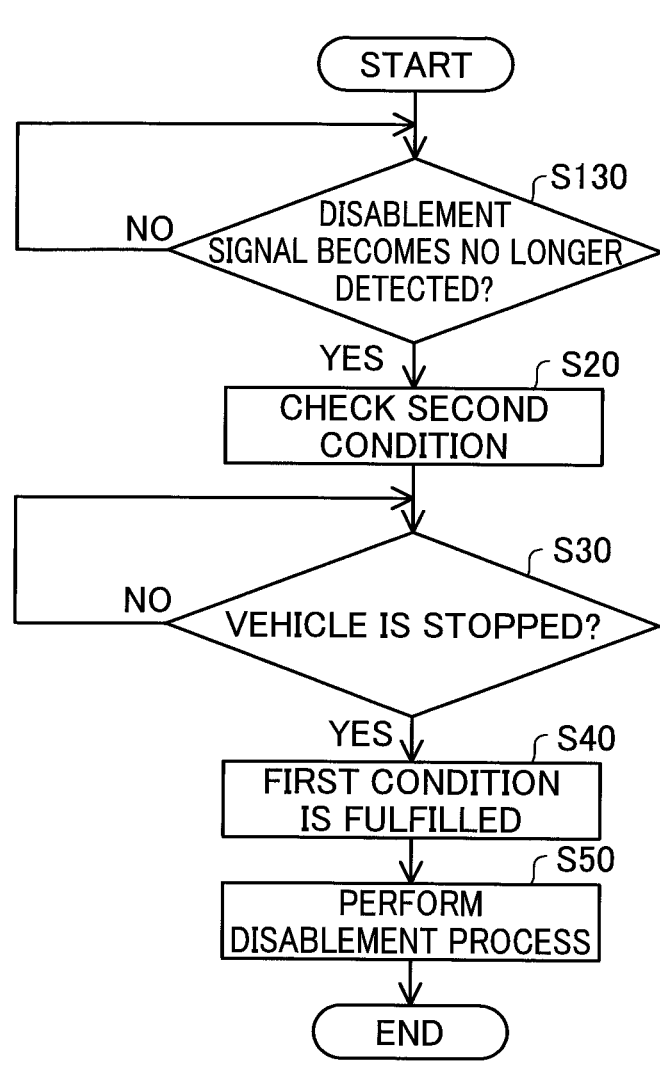
FIG. 8 is a flowchart showing a processing routine of a method of disabling remote control according to the third embodiment.

FIG. 8 is a flowchart showing a processing routine of a method of disabling remote control according to the third embodiment. The disablement method according to the third embodiment differs from the disablement method according to the first embodiment in that it includes step S130 instead of step S10. In the present embodiment, the disablement implementation unit 212 determines fulfillment of the second condition 224 after an disablement signal, namely, an electric wave for radio communication having been detected becomes no longer detected.

As shown in FIG. 8, in step S130, the disablement implementation unit 212 determines that an electric wave for radio communication becomes no longer received by the vehicle communication unit 190 from the access point 70 outside the vehicle 100. "The case where the electric wave for radio communication becomes no longer received" includes not only a case where the electric wave for radio communication becomes no longer received completely but also a case where a state of communication between the vehicle communication unit 190 and the access point 70 is weakened to such a level as will disable the radio communication function. "The case where a state of communication between the vehicle communication unit 190 and the access point 70 is weakened" includes a case where radio field strength at the access point 70 becomes equal to or less than a certain threshold or a case where channel utilization at the access point 70 becomes equal to or greater than a certain threshold, for example. If the electric wave for radio communication having been received becomes no longer received (S130: YES), the process is moved to step S20.

Figure 9:
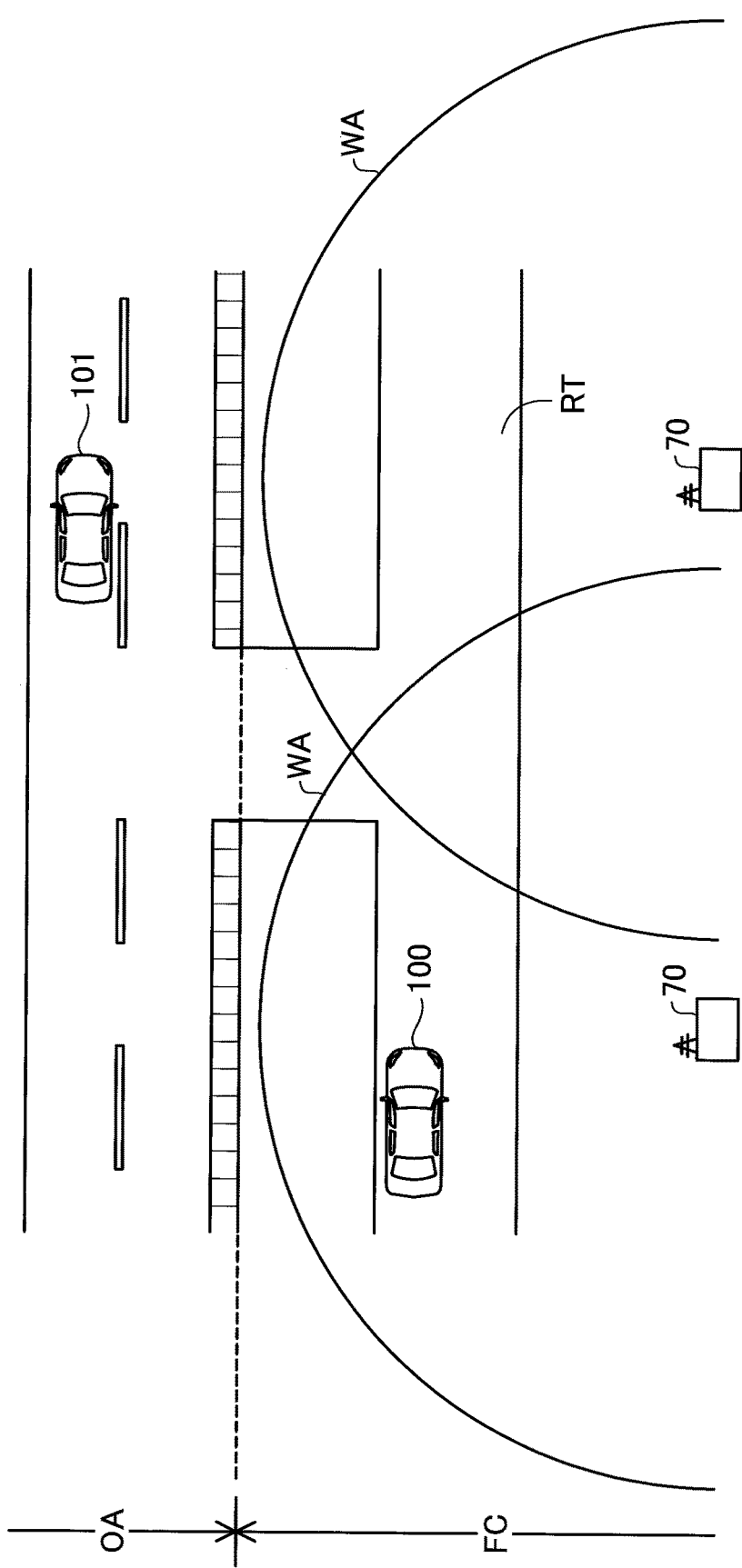
FIG. 9 is an explanatory view showing a method of detecting an disablement signal according to the third embodiment.

FIG. 9 is an explanatory view showing a method of detecting an disablement signal according to the third embodiment. As shown in FIG. 9, a plurality of the access points 70 each has a communication area WA where it is possible to make radio communication. The communication area WA is configured to cover the track RT along which the vehicle 100 runs in the factory FC by the self-running conveyance. By contrast, the communication area WA is not provided in a region OA outside the factory FC.

In the illustration in FIG. 9, when the vehicle 100 runs along the track RT in the factory FC by the self-running conveyance, the vehicle 100 receives an electric wave for radio communication from the access point 70. Thus, the second condition 224 is not checked. By contrast, if the vehicle 100 moves from the inside of the factory FC to the region OA as shown as a vehicle 101 in FIG. 9 to get out of the communication area WA, the electric wave for radio communication having been detected becomes no longer received by the vehicle communication unit 190. In this case, the second condition 224 is checked.

As described above, according to the vehicle 100 of the present embodiment, an disablement signal is an electric wave for radio communication received by the vehicle communication unit 190 as the signal detection unit 160 from the access point 70. If the vehicle communication unit 190 determines that the electric wave for radio communication having been detected becomes no longer received, the disablement implementation unit 212 performs the disablement process. In this way, instead of a dedicated device for emitting the disablement signal, the electric wave for radio communication used for remote control over the vehicle 100 is used as so-called Geofencing, making it possible to suppress or prevent increase in parts count in the factory FC.

D. Fourth Embodiment

Figure 10:
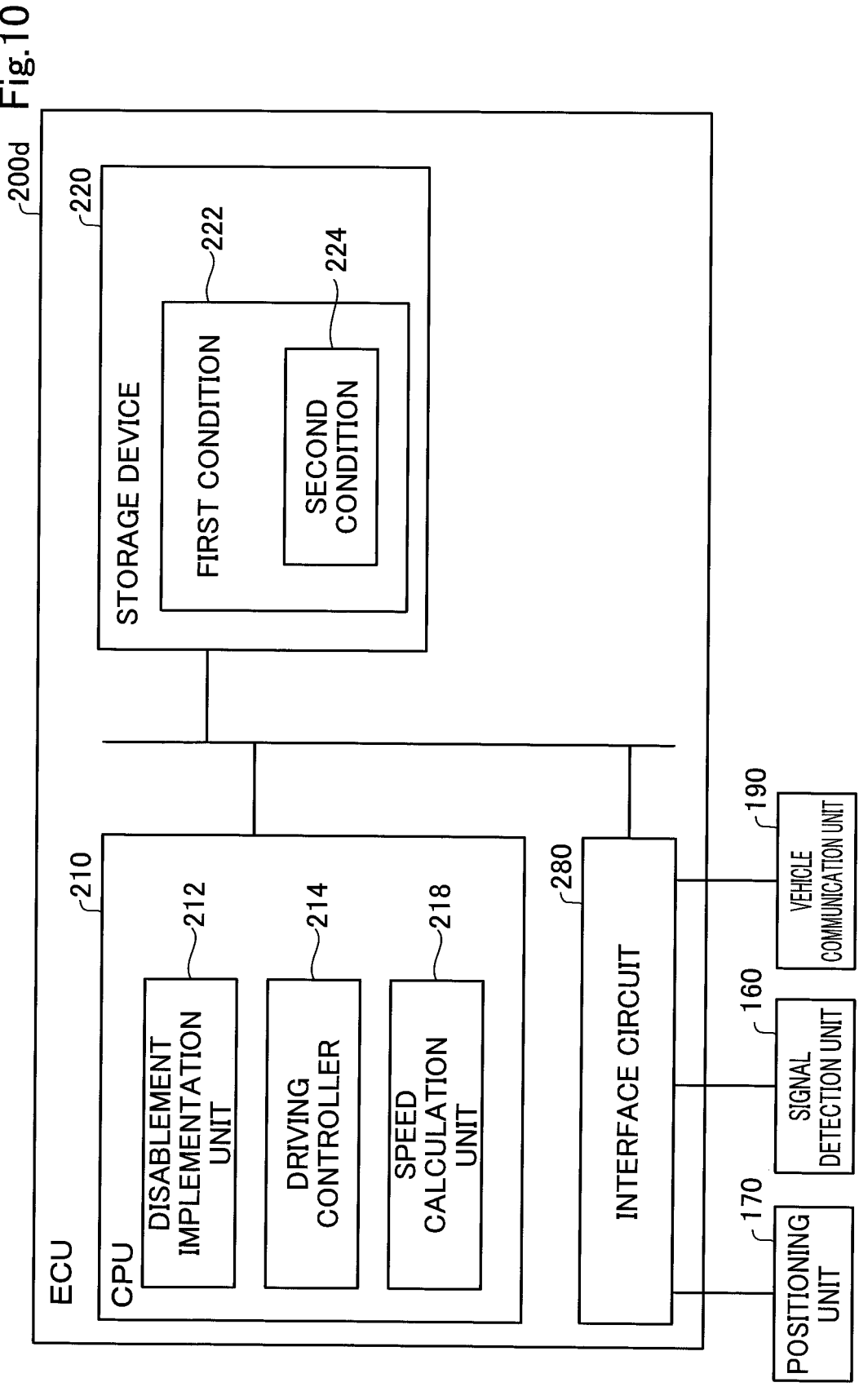
FIG. 10 is a block diagram showing a functional configuration of an ECU provided at a vehicle according to a fourth embodiment.

FIG. 10 is a block diagram showing a functional configuration of an ECU 200*d* provided at the vehicle 100 according to a fourth embodiment. As shown in FIG. 10, the ECU 200*d* differs from the ECU 200 described in the first embodiment in that the CPU 210 further functions as a speed calculation unit 218 and a positioning unit 170 is further connected to the interface circuit 280.

The positioning unit 170 includes a receiver for a global navigation satellite system (GNSS). The positioning unit 170 determines a latitude and a longitude corresponding to a current location of the vehicle 100 on the basis of an electric wave received from an artificial satellite forming the GNSS. The speed calculation unit 218 calculates a moving speed of the vehicle 100 using location information acquired by the positioning unit 170. Using the location information acquired by the positioning unit 170 makes it possible to acquire a moving speed of the vehicle 100 in a stopped state such as a transport speed of the vehicle 100, for example. The positioning unit 170 may output the moving speed of the vehicle 100.

Figure 11:
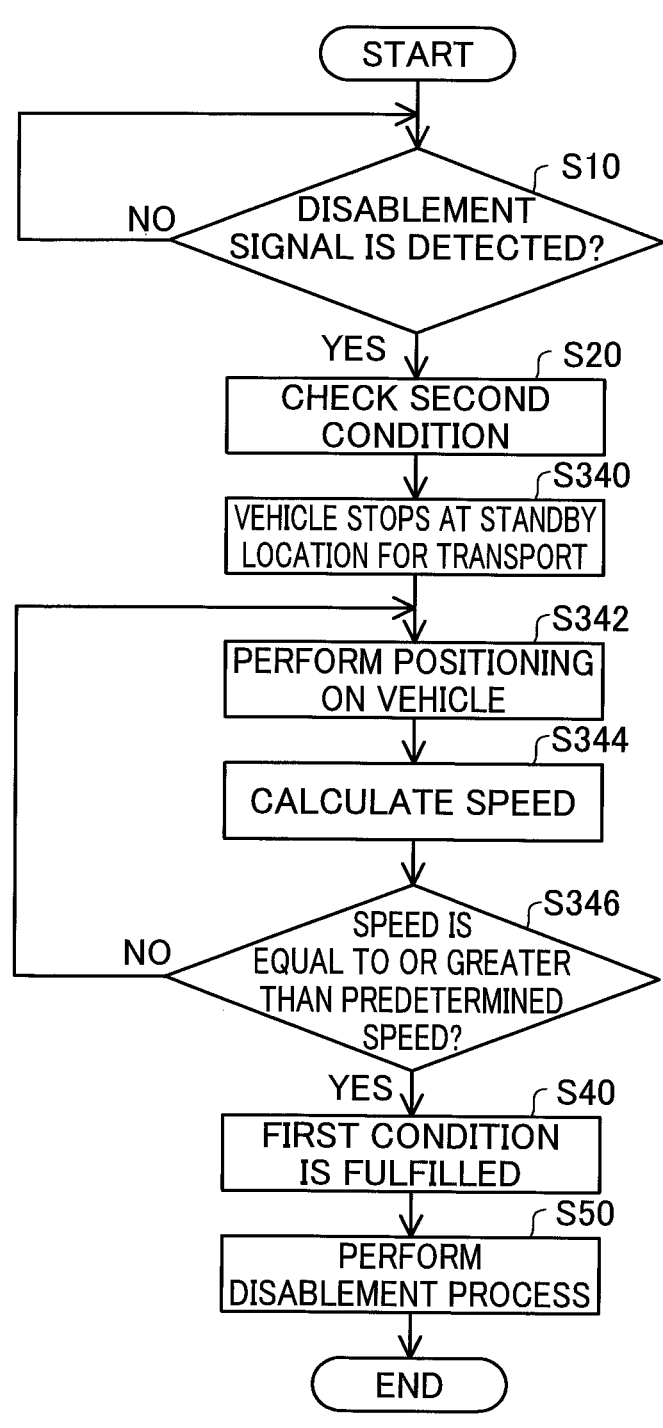
FIG. 11 is a flowchart showing a processing routine of a method of disabling remote control according to the fourth embodiment.
Figure 12:
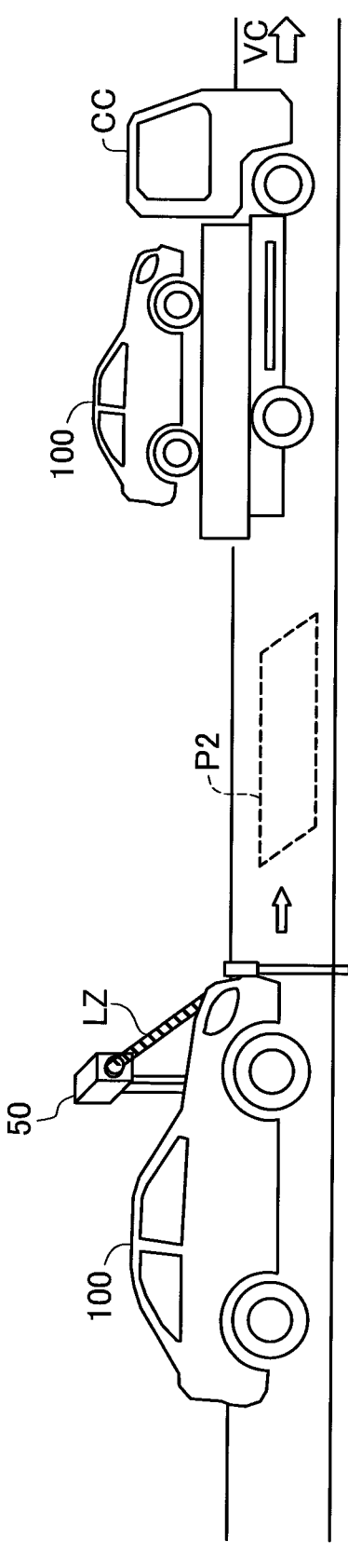
FIG. 12 is an explanatory view showing a method of judging a second condition according to the fourth embodiment.

FIG. 11 is a flowchart showing a processing routine of a method of disabling remote control according to the fourth embodiment. FIG. 12 is an explanatory view showing a method of judging the second condition 224 according to the fourth embodiment. The disablement method according to the fourth embodiment differs from the disablement method according to the first embodiment in that it includes steps from step S340 to step S346 instead of step S30. This will be described in more detail. In the example shown in the above-described first embodiment, the second condition 224 is fulfilled if stop of the vehicle 100 is detected after detection of an disablement signal. By contrast, in the present embodiment, the second condition 224 is fulfilled if it is judged using location information acquired by the positioning unit 170 that a moving speed of the vehicle 100 in a stopped state is equal to or greater than a predetermined speed after detection of an disablement signal. In the present embodiment, the second condition 224 is checked after detection of the disablement signal. Meanwhile, the second condition 224 may be checked after the disablement signal becomes no longer detected.

In step S340, after detection of the disablement signal, the vehicle 100 is stopped at a certain standby location by the self-running conveyance implemented by the remote controller 312. In the illustration in FIG. 12, the disablement signal is judged to be detected in response to detection of the laser light LZ from the laser oscillator 50 by the signal detection unit 160 during implementation of the self-running conveyance on the vehicle 100. Then, as a result of implementation of the self-running conveyance, the vehicle 100 is stopped at the parking location P2 for waiting for loading for shipment, for example.

In step S342, the positioning unit 170 performs positioning on the vehicle 100 to acquire a current location of the vehicle 100. The acquisition of the current location by the positioning unit 170 is carried out at a certain time interval. In step S344, the speed calculation unit 218 acquires a moving speed of the vehicle 100 at a certain time interval. Step S340 may be omitted and the positioning unit 170 may acquire the current location of the vehicle 100 from a moment when the disablement signal is detected.

In step S346, the disablement implementation unit 212 monitors the moving speed calculated by the speed calculation unit 218, and judges whether the moving speed becomes equal to or greater than a predetermined threshold. This threshold is used for determining that the vehicle 100 is being transported, for example. Thus, in response to bringing the vehicle 100 out of the factory FC as a trigger, it becomes possible to disable the function of remote control over the vehicle 100. The threshold is a speed higher than a speed of running of the vehicle 100 by remote control in the factory FC, and may be set using a moving speed of a transport vehicle that might be reached during transport of the vehicle 100, for example.

If the moving speed of the vehicle 100 is less than the threshold (S346: NO), the disablement implementation unit 212 returns the process to step S342. If the moving speed of the vehicle 100 is equal to or greater than the threshold (S346: YES), the disablement implementation unit 212 moves the process to step S40 and judges that the first condition 222 including the second condition 224 is fulfilled. In the illustration in FIG. 12, the second condition 224 is not fulfilled while the vehicle 100 is waiting at the parking location P2 for loading by a vehicle carrier CC. If the vehicle 100 is transported by the vehicle carrier CC and a running speed VC of the vehicle carrier CC becomes equal to or greater than the threshold, the disablement implementation unit 212 judges that the second condition 224 is fulfilled.

As described above, the vehicle 100 of the present embodiment further includes the positioning unit 170 that acquires location information about the vehicle 100. If the disablement implementation unit 212 determines using the location information acquired by the positioning unit 170 that the vehicle 100 in a stopped state is moving at a speed equal to or greater than a predetermined speed, the disablement implementation unit 212 judges that the second condition 224 is fulfilled. Using the positioning unit 170 allows detection of a moving speed other than a speed during implementation of the self-running conveyance on the vehicle 100. By using a moving speed of the vehicle 100 in a stopped state, a transport speed of the vehicle 100 during shipment of the vehicle 100 having been manufactured in the factory FC becomes available. As a result, it is possible for the vehicle 100 to perform the disablement process in a stand-alone state during shipment without making communication with a device outside the vehicle 100 such as the server 300.

E. Fifth Embodiment

Figure 13:
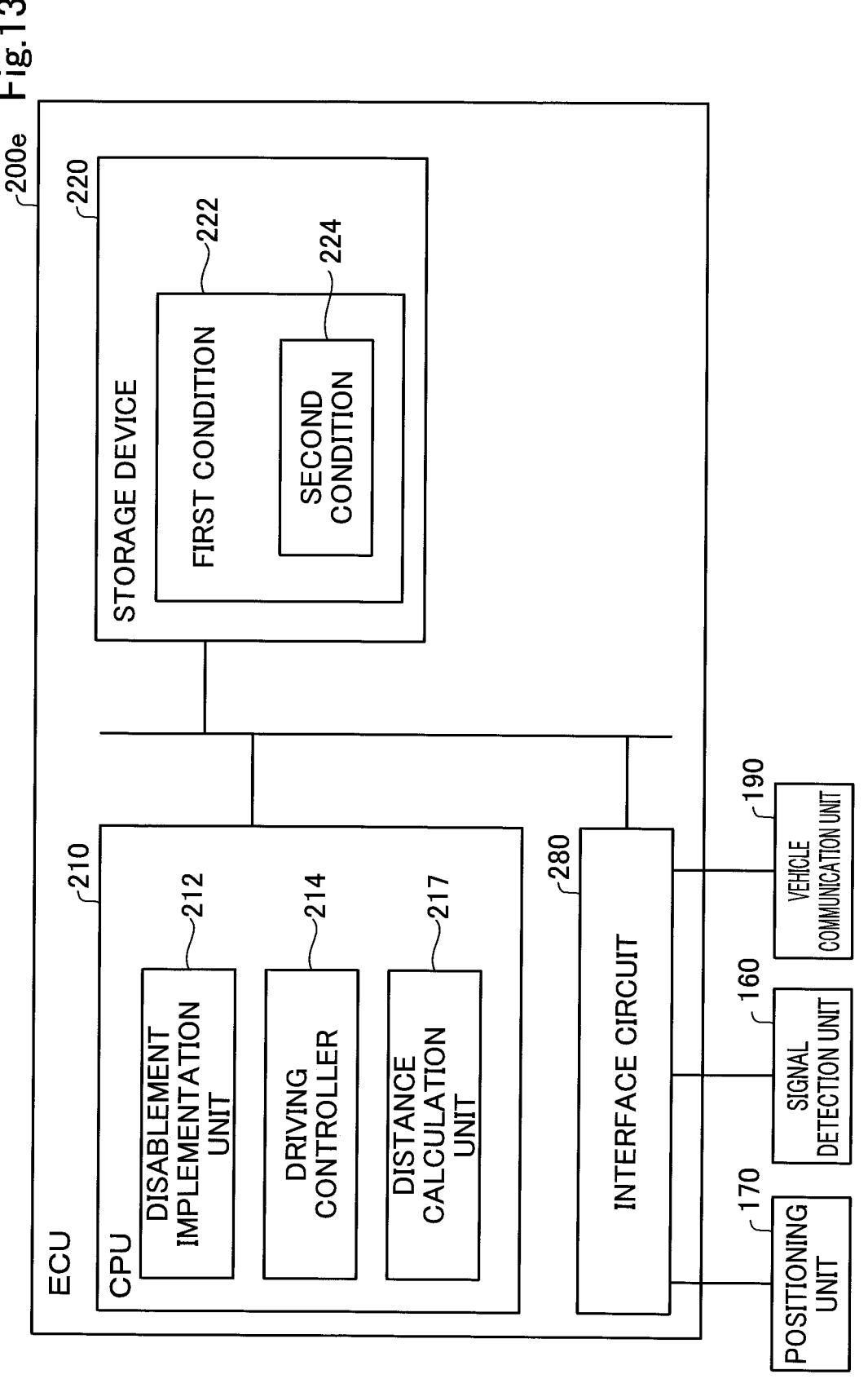
FIG. 13 is a block diagram showing a functional configuration of an ECU provided at a vehicle according to a fifth embodiment.

FIG. 13 is a block diagram showing a functional configuration of an ECU 200*e* provided at the vehicle 100 according to a fifth embodiment. As shown in FIG. 13, the ECU 200*e* differs from the ECU 200 described in the first embodiment in that the CPU 210 further functions as a distance calculation unit 217 and a positioning unit 170 is further connected to the interface circuit 280. The positioning unit 170 has a function same as that of the positioning unit 170 described in the fourth embodiment.

The distance calculation unit 217 calculates a moving distance of the vehicle 100 using location information acquired by the positioning unit 170. Using the location information acquired by the positioning unit 170 makes it possible to acquire a moving distance of the vehicle 100 in a stopped state. The moving distance may be a moving distance to a current location along a route along which the vehicle 100 has moved from a measurement start location, or may be a linear distance from the measurement start location to the current location. The positioning unit 170 may output the moving distance of the vehicle 100.

Figure 14:
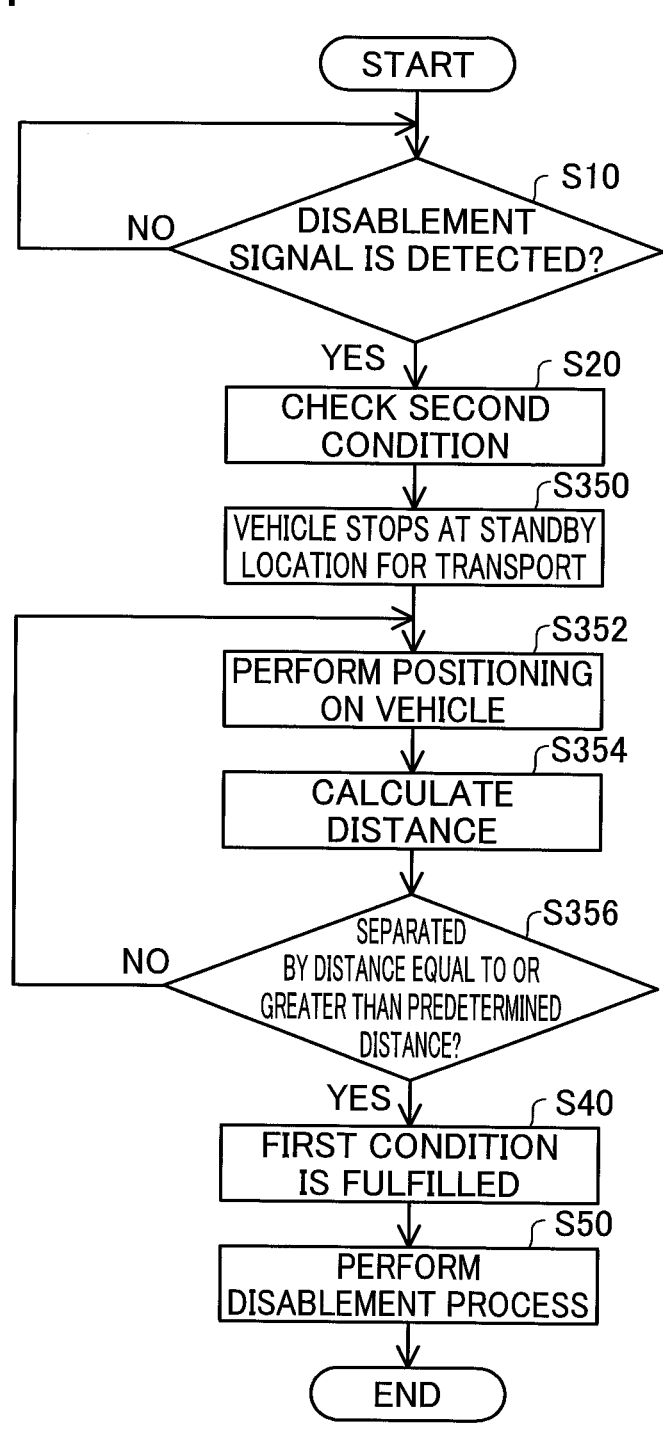
FIG. 14 is a flowchart showing a processing routine of a method of disabling remote control according to the fifth embodiment.
Figure 15:
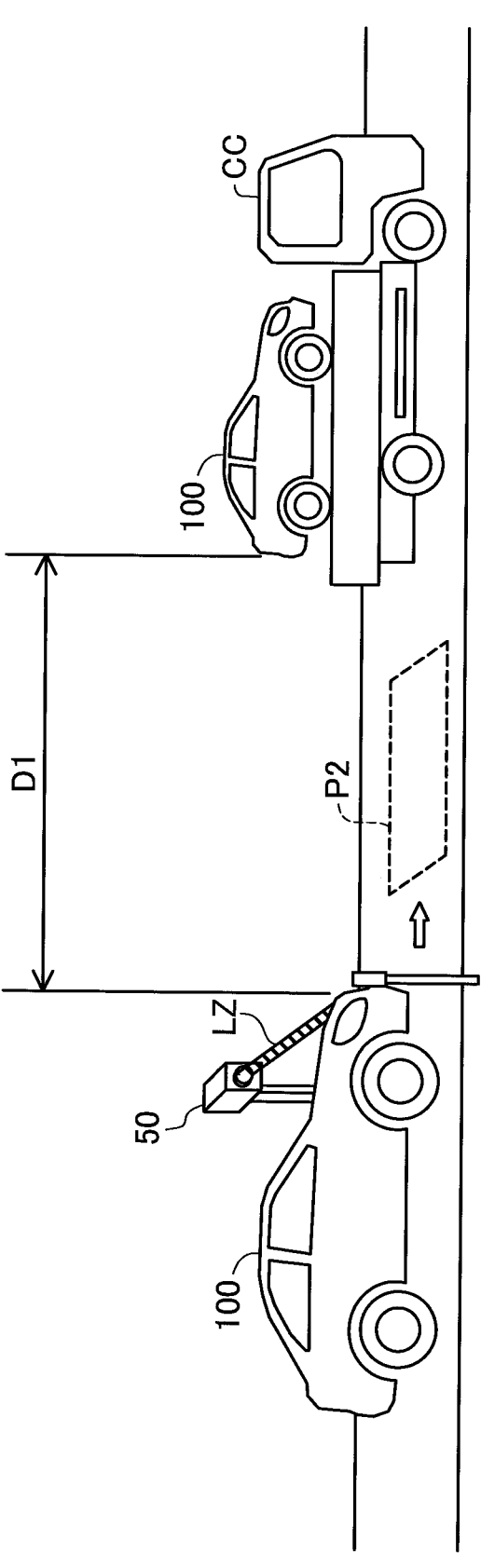
FIG. 15 is an explanatory view showing a method of judging a second condition according to the fifth embodiment.

FIG. 14 is a flowchart showing a processing routine of a method of disabling remote control according to the fifth embodiment. FIG. 15 is an explanatory view showing a method of judging the second condition 224 according to the fifth embodiment. The disablement method according to the fifth embodiment differs from the disablement method according to the first embodiment in that it includes steps from step S350 to step S356 instead of step S30. In the present embodiment, the second condition 224 is fulfilled if the vehicle 100 is judged to have gotten away from a location where an disablement signal is detected by a distance equal to or greater than a predetermined distance. In the present embodiment, the second condition 224 is checked after detection of the disablement signal. Meanwhile, the second condition 224 may be checked after the disablement signal becomes no longer detected.

In step S350, after detection of the disablement signal, the vehicle 100 is stopped at a certain standby location by the self-running conveyance implemented by the remote controller 312. In the illustration in FIG. 15, after detection of the laser light LZ, the vehicle 100 is stopped at the parking location P2 for waiting for loading for shipment, for example.

In step S352, the positioning unit 170 performs positioning on the vehicle 100 to acquire a current location of the vehicle 100. The acquisition of the current location by the positioning unit 170 is carried out at a certain time interval. In step S354, the distance calculation unit 217 acquires a moving distance of the vehicle 100 at a certain time interval. In the illustration in FIG. 15, the moving distance of the vehicle 100 is a moving distance D1 from the location where the disablement signal is detected. The positioning unit 170 may acquire a moving distance from the parking location P2.

In step S356, the disablement implementation unit 212 monitors the moving distance calculated by the distance calculation unit 217, and judges whether the moving distance becomes equal to or greater than a predetermined threshold. This threshold is used for determining that the vehicle 100 has been transported, for example. Thus, in response to bringing the vehicle 100 out of the factory FC as a trigger, it becomes possible to disable the function of remote control over the vehicle 100. The threshold may be set using a distance from the parking location P2 to an exit from the factory FC, a distance to a location sufficiently separated from the factory FC, or an arbitrary distance equal to or greater than the former distances, for example.

If the moving distance of the vehicle 100 is less than the threshold (S356: NO), the disablement implementation unit 212 returns the process to step S352. If the moving distance of the vehicle 100 is equal to or greater than the threshold (S356: YES), the disablement implementation unit 212 moves the process to step S40 and judges that the first condition 222 including the second condition 224 is fulfilled. In the illustration in FIG. 15, if the vehicle 100 is transported by the vehicle carrier CC and a moving distance of the vehicle 100 becomes equal to or greater than the threshold, the disablement implementation unit 212 judges that the second condition 224 is fulfilled.

As described above, the vehicle 100 of the present embodiment further includes the positioning unit 170 that acquires location information about the vehicle 100. If the disablement implementation unit 212 determines using the location information acquired by the positioning unit 170 that the vehicle 100 has gotten away from a location where an disablement signal is detected by a distance equal to or greater than a predetermined distance, the disablement implementation unit 212 judges that the second condition 224 is fulfilled and performs the disablement process. Using the positioning unit 170 allows detection of a moving distance other than a distance during implementation of the self-running conveyance on the vehicle 100. By using a moving distance of the vehicle 100 in a stopped state, a moving distance determined by transport during shipment of the vehicle 100 having been manufactured in the factory FC becomes available. As a result, it is possible for the vehicle 100 to perform the disablement process in a stand-alone state during shipment without making communication with a device outside the vehicle 100 such as the server 300.

F. Sixth Embodiment

Figure 16:
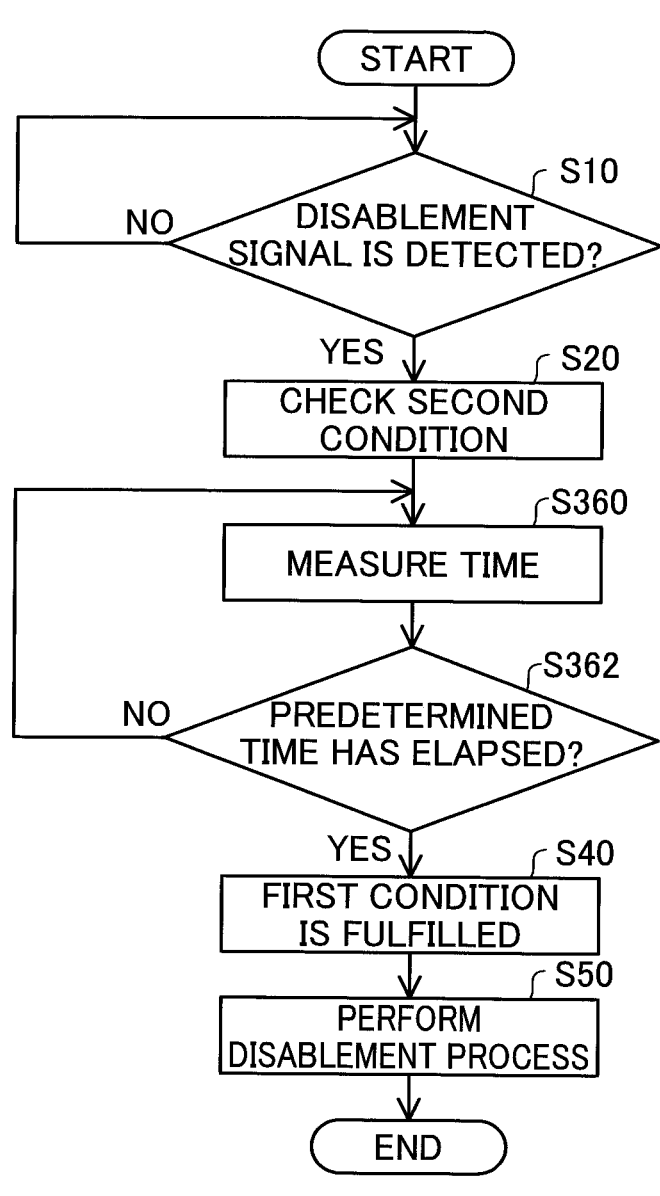
FIG. 16 is a flowchart showing a processing routine of a method of disabling remote control according to a sixth embodiment.

FIG. 16 is a flowchart showing a processing routine of a method of disabling remote control according to a sixth embodiment. The disablement method according to the sixth embodiment differs from the disablement method according to the first embodiment in that it includes step S360 and step S362 instead of step S30. In the present embodiment, if the disablement implementation unit 212 determines that predetermined time has elapsed since a moment when an disablement signal is detected, the disablement implementation unit 212 judges that the second condition 224 is fulfilled and performs the disablement process.

In step S360, the disablement implementation unit 212 starts to measure time since a moment when an disablement signal is detected using a timer not shown in the drawings. Timing for starting the time measurement is not limited to the moment when the disablement signal is detected but is arbitrarily settable to a moment when the vehicle 100 is stopped, for example. In step S362, the disablement implementation unit 212 monitors the elapsed time, and judges whether the elapsed time has exceeded predetermined time. If the elapsed time has not exceeded the predetermined time (S362: NO), the disablement implementation unit 212 returns the process to step S360. If the elapsed time has exceeded the predetermined time (S362: YES), the disablement implementation unit 212 moves the process to step S40 and judges that the first condition 222 including the second condition 224 is fulfilled.

As described above, according to the vehicle 100 of the present embodiment, if the disablement implementation unit 212 determines that predetermined time has elapsed since a moment when an disablement signal is detected, the disablement implementation unit 212 judges that the second condition 224 is fulfilled and performs the disablement process. As a result, it is possible for the vehicle 100 to perform the disablement process in a stand-alone state through the simple way of measuring time without making communication with a device outside the vehicle 100 such as the server 300.

G. Seventh Embodiment

Figure 17:
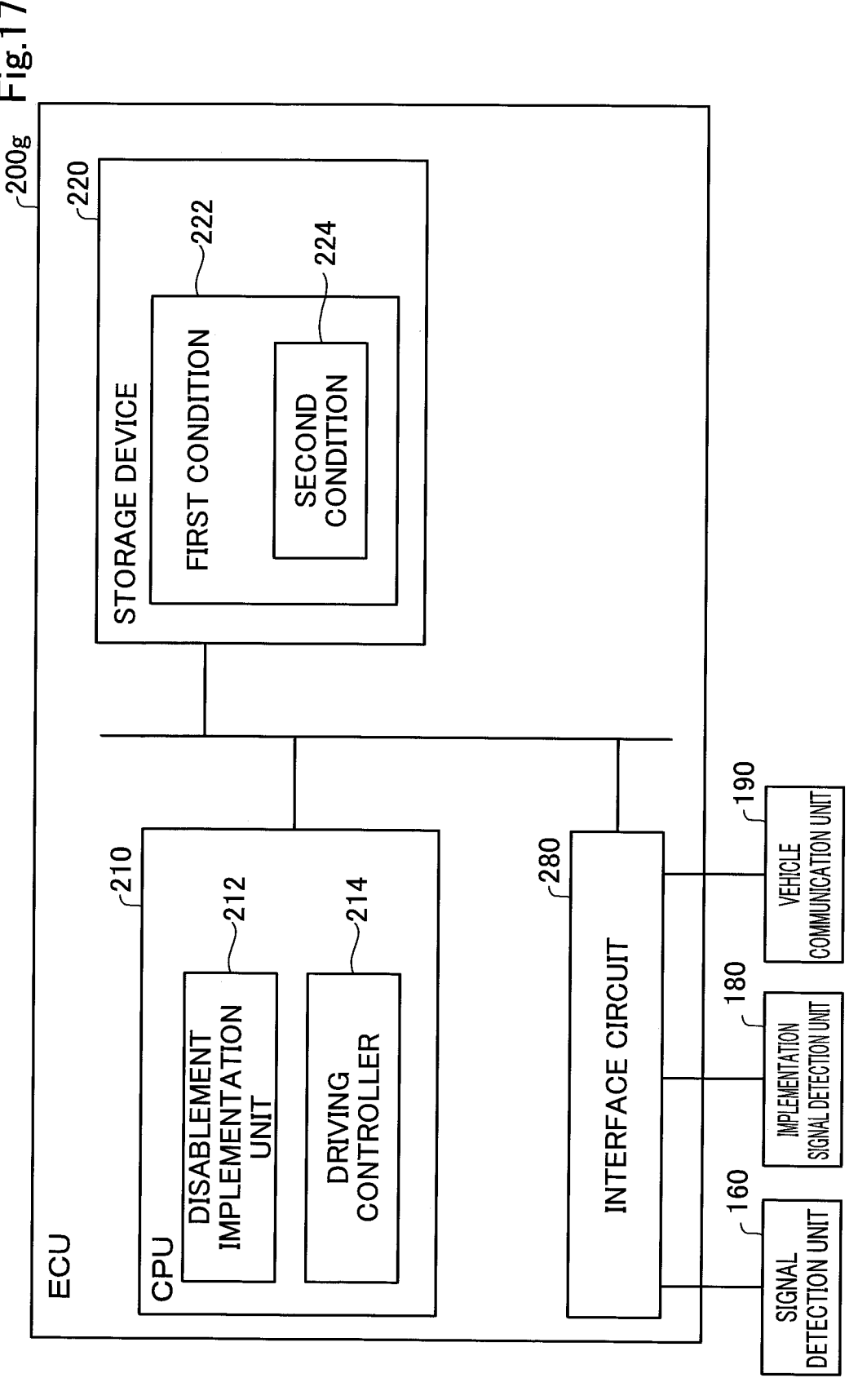
FIG. 17 is a block diagram showing a functional configuration of an ECU provided at a vehicle according to a seventh embodiment.

FIG. 17 is a block diagram showing a functional configuration of an ECU 200g provided at the vehicle 100 according to a seventh embodiment. As shown in FIG. 17, the ECU 200*g* differs from the ECU 200 described in the first embodiment in that an implementation signal detection unit 180 is further connected to the interface circuit 280.

The implementation signal detection unit 180 is a device for detecting a second disablement signal used for judging fulfillment of the second condition 224. In the present embodiment, as will be described later, two types of disablement signals are used. The signal detection unit 160 and the implementation signal detection unit 180 are configured as units separate from each other. The signal detection unit 160 is used for detecting a first disablement signal. Meanwhile, if the same signal is used as the first disablement signal and as the second disablement signal for judging fulfillment of the second condition 224, for example, the signal detection unit 160 and the implementation signal detection unit 180 may be configured integrally, for example, by making the signal detection unit 160 further function as the implementation signal detection unit 180. In the following description, the second disablement signal for judging fulfillment of the second condition 224 may also be called an "implementation signal" for discrimination.

Figure 18:
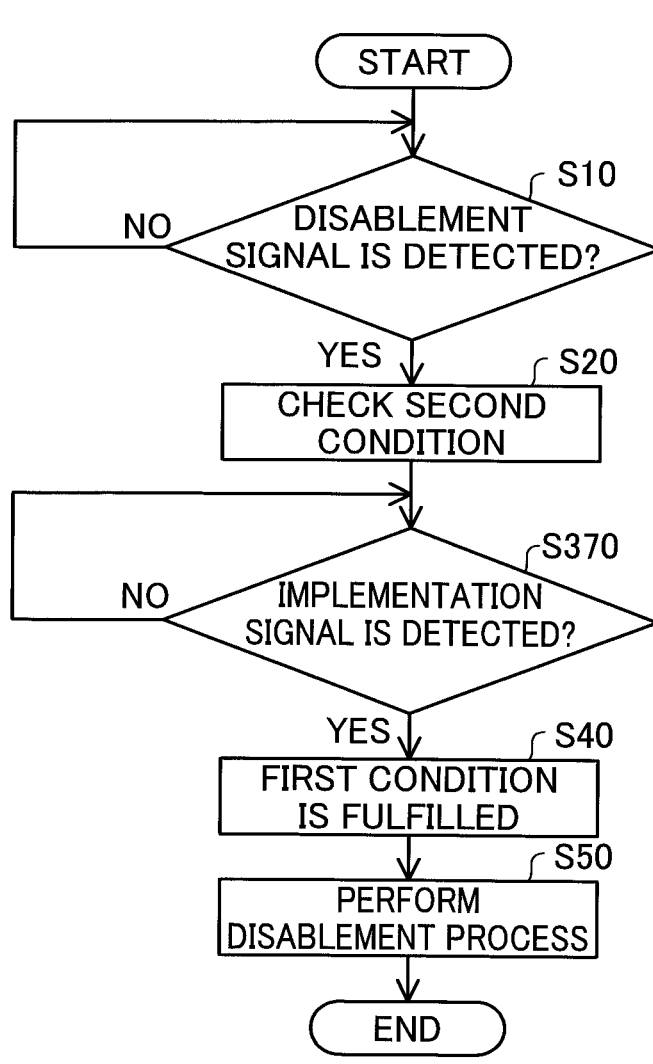
FIG. 18 is a flowchart showing a processing routine of a method of disabling remote control according to the seventh embodiment.

FIG. 18 is a flowchart showing a processing routine of a method of disabling remote control according to the seventh embodiment. The disablement method according to the seventh embodiment differs from the disablement method according to the first embodiment in that it includes step S370 instead of step S30. In the present embodiment, the second condition 224 is fulfilled if an disablement signal is detected and then an implementation signal is detected further.

In step S370, after detection of an disablement signal, the vehicle 100 waits for detection of an implementation signal by the implementation signal detection unit 180. If an implementation signal is detected (S370: YES), the disablement implementation unit 212 moves the process to step S40 and judges that the first condition 222 including the second condition 224 is fulfilled.

Figure 19:
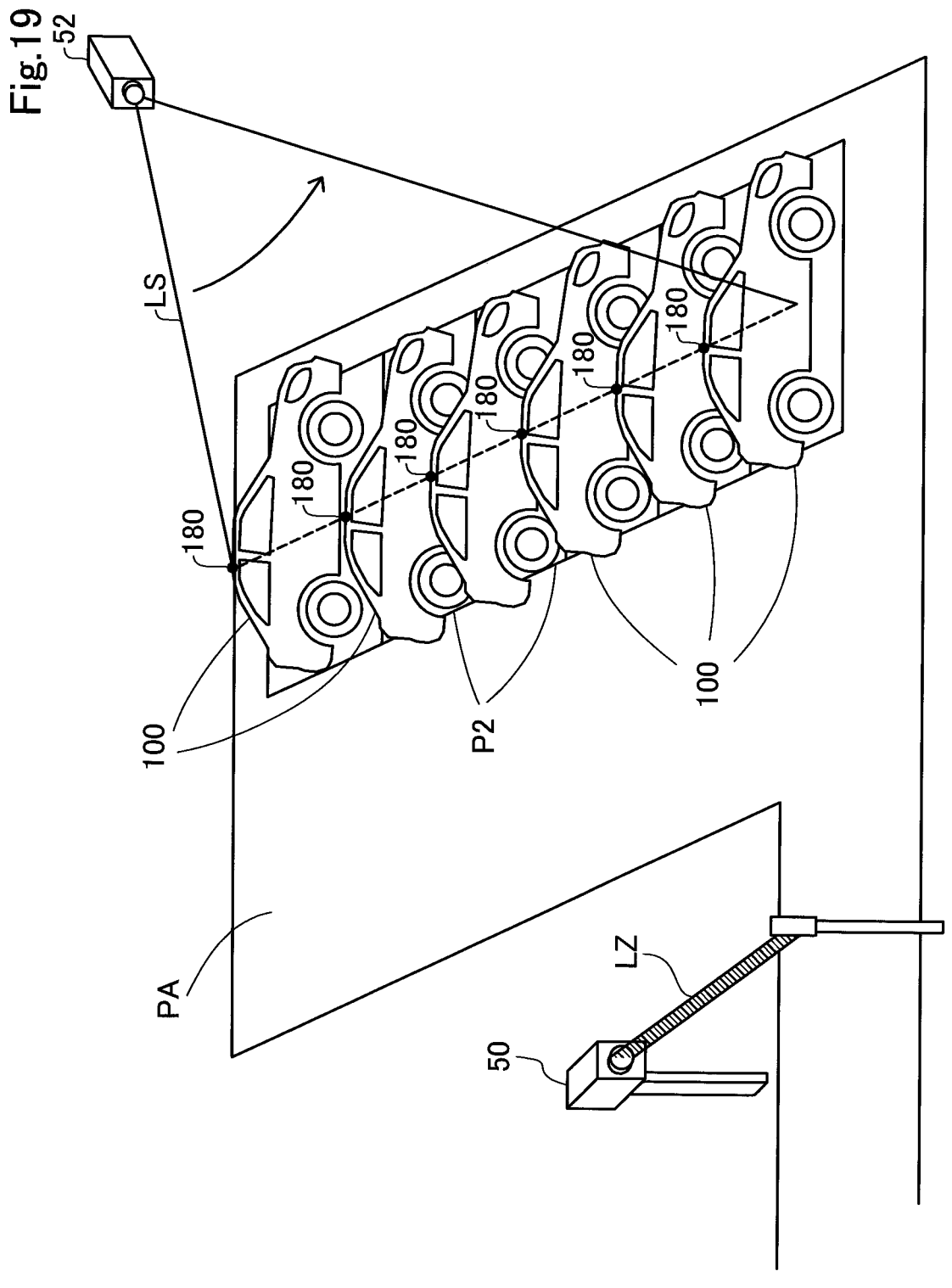
FIG. 19 is an explanatory view showing a method of judging a second condition according to the seventh embodiment.

FIG. 19 is an explanatory view showing a method of judging the second condition 224 according to the seventh embodiment. In the present embodiment, a laser scanning device 52 is provided at the standby area PA. The laser scanning device 52 functions as an disablement signal generator, and emits laser light LS functioning as an implementation signal. As shown in FIG. 19, the laser scanning device 52 is capable of scanning all vehicles 100 parked at a plurality of parking locations P2 provided in the standby area PA with the laser light LS. The implementation signal detection unit 180 is provided on an outer surface of the vehicle 100, for example, and is capable of detecting the laser light LZ emitted from the laser scanning device 52.

As shown in FIG. 19, when the vehicle 100 is transported toward the standby area PA by remote control by the remote controller 312 through implementation of the self-running conveyance, the laser light LZ as the first disablement signal is detected by the signal detection unit 160 at the entrance to the standby area PA. After detection of the first disablement signal, the vehicle 100 is stopped at the parking location P2 through implementation of the self-running conveyance. The laser scanning device 52 is started in response to parking of a plurality of the vehicles 100 at the respective parking locations P2, for example.

The laser scanning device 52 scans all the vehicles 100 parked at the parking locations P2 with the laser light LS, and the implementation signal detection unit 180 of each of the vehicles 100 detects the laser light LS as an implementation signal. This configuration allows a plurality of the vehicles 100 to fulfill the second conditions 224 at a time. In the illustration in FIG. 19, it is possible to omit the laser oscillator 50 at the entrance to the standby area PA and to cause a plurality of the vehicles 100 to detect first disablement signals at a time using only the laser scanning device 52. The laser scanning device 52 may be replaced with a device capable of emitting a certain electric wave to a plurality of the vehicles 100 at the parking locations P2. With this configuration, it is still possible to achieve comparable effect.

According to the vehicle 100 of the present embodiment, if an disablement signal is detected and then an implementation signal is detected further, the disablement implementation unit 212 judges that the second condition 224 is fulfilled and performs the disablement process. Thus, it is possible to reduce or prevent the occurrence of trouble of disabling remote control erroneously by using the two or more conditions employing the simple way of detecting the laser light LZ, LS. Furthermore, sharing the same signal between an disablement signal and an implementation signal allows the signal detection unit 160 to further function as the implementation signal detection unit 180, for example. By doing so, it becomes possible to suppress or prevent increase in parts count.

Figure 20:
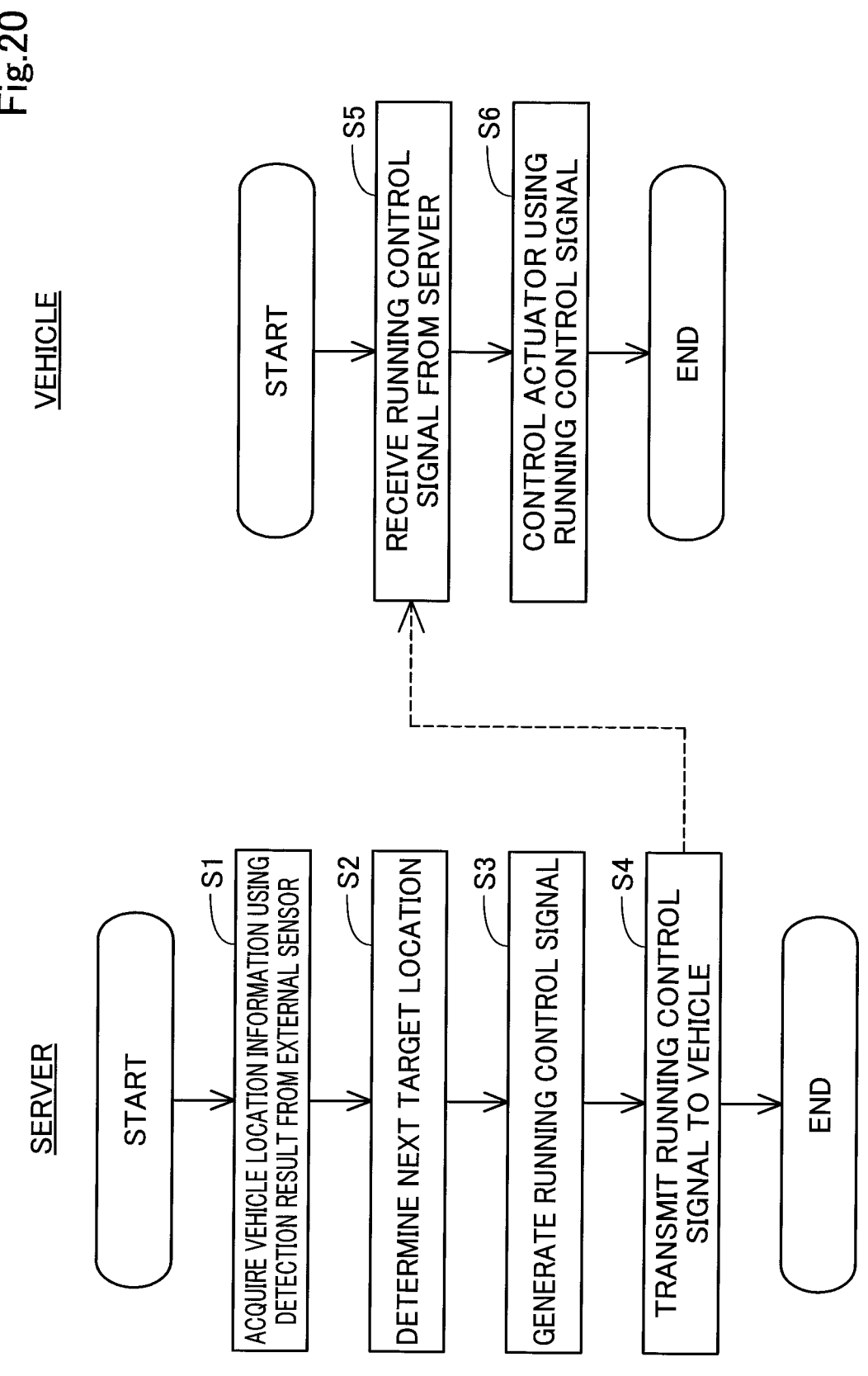
FIG. 20 is a flowchart showing a procedure of running control over a vehicle applicable to each of the embodiments.

FIG. 20 is a flowchart showing a procedure of running control over a vehicle applicable to each of the embodiments. In step S1, the server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S1, the server 300 acquires the vehicle location information using the captured image acquired from the camera as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 500 or outside the system 500. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 200 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the driving controller of the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system 500 in the present embodiment, it becomes possible to move the vehicle 100 without using a transport unit such as a crane or a conveyor.

H. Other Embodiments (H1) In the example shown in each of the above-described embodiments, an disablement signal is an electromagnetic wave such as the laser light LZ, LS or an electric wave for radio communication. Meanwhile, the disablement signal (including an implementation signal) may be a signal using an element other than an electromagnetic wave, and may be at least one signal selected from a group consisting of sound, heat, a current, a distance, an image, an atmospheric pressure, an acceleration, a rotation speed, a humidity, and a pressure. In this case, general-purpose sensors are available as the signal detection unit 160 and the implementation signal detection unit 180. The disablement signal may be composed of an image, a pattern, or a predetermined target, for example, detectable by the vehicle 100. In this case, the disablement signal generator to be employed may be a sign indicating a one-dimensional code, a two-dimensional code, or a certain pattern, or a target having a certain appearance shape, for example. In this case, the signal detection unit 160 and the implementation signal detection unit 180 to be used may be cameras or readers, for example, capable of detecting an image or a pattern indicated by a sign, or an appearance shape of a target. The disablement implementation unit 212 generates an disablement signal in response to detection of a pattern, etc. as the disablement signal by the signal detection unit 160 and the implementation signal detection unit 180 as a trigger.

(H2) In the example shown in the above-described first embodiment, the remote controller 312 acquires an image captured by the camera 80 and performs image analysis on the acquired captured image, thereby acquiring vehicle information including the location or position of the vehicle 100. Meanwhile, if the vehicle detector is other than the camera 80 and is LiDAR, an infrared sensor, a laser sensor, an ultrasonic sensor, or a millimeter wave radar, for example, driving control over the vehicle 100 by remote control may be implemented by analyzing detection result acquired by the vehicle detector other than the camera 80. In another case, the camera 80 and the vehicle detector other than the camera 80 may be used in combination.

(H3) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(H4) In the above-described first embodiment, the server 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(H5) In the above-described first embodiment, the server 300 automatically generates a running control signal to be transmitted to the vehicle 100. By contrast, the server 200 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device.

(H6) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(H7) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(H8) A configuration for realizing running of the vehicle 100 by unmanned driving is also called a "Remote Control auto Driving system". Conveying a vehicle using Remote Control Auto Driving system is also called "self-running conveyance". Producing a vehicle using self-running conveyance is also called "self-running production". In self-running production, for example, at least part of the conveyance of vehicles is realized by self-running conveyance in a factory where the vehicle is manufactured.

The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The present disclosure is not limited to the embodiments described above and is able to be realized with various configurations without departing from the spirit thereof. For example, technical features in the embodiments corresponding to the technical features in the aspects described in the section of SUMMARY are able to be replaced with each other or combined together as necessary in order to solve part or the whole of the problems described previously or to achieve part or the whole of the effects described previously. When the technical features are not described as essential features in the present specification, they are able to be deleted as necessary.

What is claimed is:

1. A moving object movable by remote control, comprising:

one or more processors and a memory storing a program executed by the one or more processors, wherein the processors are configured to:

receive a request for driving control from outside the moving object;

implement driving control over the moving object in response to the request for driving control during a course of manufacture in a factory for manufacture of the moving object;

detect a disablement signal detectable at a predetermined place along a moving route of the moving object; and perform a disablement process for disabling the remote control if a first condition is fulfilled, the first condition being fulfilled at least if the disablement signal is detected or the disablement signal having been detected becomes no longer detected, wherein the disablement process disables the remote control irreversibly as the disablement process.

2. The moving object according to claim 1, wherein the disablement signal is an electromagnetic wave including laser light and an electric radio wave, and the first condition is fulfilled if the electromagnetic wave is detected by the one or more processors.

3. The moving object according to claim 1, wherein the disablement signal is an electric wave for radio communication received from outside the moving object, and the first condition is fulfilled if the electric wave for radio communication having been detected becomes no longer detected.

4. The moving object according to claim 1, wherein the first condition is fulfilled if the disablement signal is detected and then a second condition is fulfilled further, or if the disablement signal having been detected becomes no longer detected and then the second condition is fulfilled further.

5. The moving object according to claim 4, wherein the one or more processors is further configured to:

acquire location information about the moving object, and wherein the second condition is fulfilled if moving, of the moving object carried on a vehicle carrier and in a stopped state, at a speed equal to or greater than a predetermined speed is detected using the location information acquired by the one or more processors.

6. The moving object according to claim 4, wherein the one or more processors is further configured to:

acquire location information about the moving object, wherein the second condition is fulfilled if, by using the location information, the moving object is detected moving, by a distance equal to or greater than a predetermined distance, from a location where the disablement signal is detected to a location where the disablement signal is no longer detected.

7. The moving object according to claim 4, wherein the second condition is fulfilled if a lapse of predetermined time is detected, the predetermined time being time since the disablement signal is detected or since the disablement signal having been detected becomes no longer detected.

8. The moving object according to claim 4, wherein the second condition is fulfilled if the moving object is stopped after the disablement signal is detected or after the disablement signal having been detected becomes no longer detected.

9. The moving object according to claim 4, wherein the second condition is fulfilled if a second disablement signal is detected further after the disablement signal is detected or after the disablement signal having been detected becomes no longer detected.

10. A remote driving system comprising:

a remote controller configured to move a moving object by remote control, the moving object being movable by the remote control during a course of manufacture in a factory for manufacture of the moving object, the moving object including a moving object communication unit configured to receive a request for driving control, and a driving controller configured to be capable of implementing driving control over the moving object in response to the request for driving control;

a disablement signal generator arranged at a predetermined place along a moving route of the moving object, and configured to generate a disablement signal;

a signal detection unit configured to detect the disablement signal; and a disablement implementation unit configured to perform a disablement process for disabling the remote control if a first condition is fulfilled, the first condition being fulfilled at least if the disablement signal is detected or the disablement signal having been detected becomes no longer detected, wherein the disablement implementation unit disables the remote control irreversibly as the disablement process.

11. A method of disabling remote control over a moving object movable by remote control, comprising:

implementing driving control over the moving object in response to a request for driving control from outside the moving object during a course of manufacture in a factory for manufacture of the moving object; and performing a disablement process for disabling the remote control if a first condition is fulfilled, the first condition being fulfilled at least if a disablement signal is detected at a predetermined place along a moving route of the moving object or the disablement signal having been detected at the place becomes no longer detected, wherein the performing the disablement process includes disabling the remote control irreversibly as the disablement process.

* * * * *